US009849771B2

(12) United States Patent
Zhang et al.

(10) Patent No.: US 9,849,771 B2
(45) Date of Patent: Dec. 26, 2017

(54) TRANSMISSION UNIT, POWER TRANSMISSION SYSTEM AND VEHICLE COMPRISING THE SAME

(71) Applicant: BYD COMPANY LIMITED, Shenzhen, Guangdong (CN)

(72) Inventors: Jintao Zhang, Guangdong (CN); Yu Hua, Guangdong (CN); Lingdao Chai, Guangdong (CN); Jinhui Mu, Guangdong (CN); Jing Liu, Guangdong (CN)

(73) Assignee: BYD Company Limited, Shenzhen (CN)

( * ) Notice: Subject to any disclaimer, the term of this patent is extended or adjusted under 35 U.S.C. 154(b) by 176 days.

(21) Appl. No.: 14/755,775

(22) Filed: Jun. 30, 2015

(65) Prior Publication Data
US 2016/0207392 A1 Jul. 21, 2016

(30) Foreign Application Priority Data
Jan. 16, 2015 (CN) .......................... 2015 1 0024198

(51) Int. Cl.
*B60K 6/36* (2007.10)
*B60K 6/38* (2007.10)
(Continued)

(52) U.S. Cl.
CPC ................. *B60K 6/40* (2013.01); *B60K 6/36* (2013.01); *B60K 6/365* (2013.01); *B60K 6/38* (2013.01);
(Continued)

(58) Field of Classification Search
CPC . B60K 6/36; B60K 6/40; B60K 6/448; B60K 6/48; B60K 6/50; B60K 6/547; F16H 3/006; F16H 3/085; F16H 3/093
See application file for complete search history.

(56) References Cited

U.S. PATENT DOCUMENTS

| 4,132,133 A | 1/1979 | Ballendux |
| 4,610,177 A | 9/1986 | Mahoney |

(Continued)

FOREIGN PATENT DOCUMENTS

| CN | 102166962 | 8/2011 |
| CN | 102343824 | 2/2012 |

(Continued)

OTHER PUBLICATIONS

Extended European Search Report dated Jun. 29, 2016, issued in related European Patent Application No. 15158699.7 (8 pages).
(Continued)

*Primary Examiner* — Jacob S Scott

(57) ABSTRACT

A transmission unit includes: input shafts; output shafts configured to transmit with a corresponding input shaft via gears; a reverse output gear fitted over one output shaft; a reverse synchronizer; a reverse shaft configured to rotate together with a input shaft and a reverse output gear; a motor power shaft; a first and a second motor gears fitted over the motor power shaft; the second motor gear configured to rotate together with a shift driven gear; and a motor synchronizer. A power transmission system including the transmission unit and a vehicle including the power transmission system are also provided.

24 Claims, 13 Drawing Sheets

(51) Int. Cl.

| | | |
|---|---|---|
| *B60K 6/40* | (2007.10) | |
| *B60K 6/448* | (2007.10) | |
| *B60K 6/52* | (2007.10) | |
| *B60K 6/547* | (2007.10) | |
| *F16H 3/00* | (2006.01) | |
| *F16H 3/085* | (2006.01) | |
| *F16H 37/08* | (2006.01) | |
| *B60K 6/365* | (2007.10) | |
| *B60K 6/48* | (2007.10) | |
| *F16H 3/08* | (2006.01) | |
| *F16H 3/093* | (2006.01) | |
| *B60K 1/02* | (2006.01) | |
| *B60K 17/356* | (2006.01) | |

(52) U.S. Cl.
CPC .............. *B60K 6/448* (2013.01); *B60K 6/48* (2013.01); *B60K 6/52* (2013.01); *B60K 6/547* (2013.01); *F16H 3/006* (2013.01); *F16H 3/085* (2013.01); *F16H 37/0806* (2013.01); *B60K 1/02* (2013.01); *B60K 17/356* (2013.01); *B60K 2006/4841* (2013.01); *B60Y 2304/00* (2013.01); *B60Y 2400/428* (2013.01); *B60Y 2400/70* (2013.01); *B60Y 2400/80* (2013.01); *F16H 2003/0822* (2013.01); *F16H 2003/0931* (2013.01); *Y02T 10/6221* (2013.01); *Y02T 10/6243* (2013.01); *Y02T 10/6265* (2013.01); *Y10S 903/909* (2013.01); *Y10S 903/911* (2013.01); *Y10S 903/912* (2013.01); *Y10S 903/915* (2013.01)

(56) References Cited

U.S. PATENT DOCUMENTS

| | | |
|---|---|---|
| 4,676,115 A | 6/1987 | Morscheck et al. |
| 5,081,365 A | 1/1992 | Field et al. |
| 5,586,613 A | 12/1996 | Ehsani |
| 5,890,392 A | 4/1999 | Ludanek et al. |
| 6,120,115 A | 9/2000 | Manabe |
| 6,364,434 B1 | 4/2002 | Sway-Tin et al. |
| 6,634,247 B2 | 10/2003 | Pels |
| 7,296,648 B2 | 11/2007 | Tatara et al. |
| 7,383,749 B2 | 6/2008 | Schafer et al. |
| 7,395,889 B2 | 7/2008 | Sugiyama et al. |
| 7,428,852 B2 | 9/2008 | Baldwin et al. |
| 7,437,966 B2 | 10/2008 | Maillard et al. |
| 7,730,982 B2 | 6/2010 | Hidaka et al. |
| 7,987,739 B2 | 8/2011 | Okadome et al. |
| 8,297,141 B2 | 10/2012 | Cimatti |
| 8,505,400 B2 | 8/2013 | Mellet et al. |
| 8,523,734 B2 | 9/2013 | Mepham et al. |
| 8,579,059 B2 | 11/2013 | Teraya |
| 8,608,615 B2 | 12/2013 | Fuechtner et al. |
| 8,887,588 B2 | 11/2014 | Koyama et al. |
| 9,003,907 B2 | 4/2015 | Weller et al. |
| 9,145,951 B2 | 9/2015 | Lee et al. |
| 9,341,239 B2 | 5/2016 | Lee et al. |
| 9,568,066 B2 | 2/2017 | Yang et al. |
| 2002/0088291 A1 | 7/2002 | Bowen |
| 2002/0177504 A1 | 11/2002 | Pels et al. |
| 2003/0184147 A1 | 10/2003 | Perach et al. |
| 2004/0204286 A1 | 10/2004 | Stridsberg |
| 2005/0139035 A1 | 6/2005 | Lee et al. |
| 2006/0048516 A1 | 3/2006 | Tenbrock et al. |
| 2006/0175103 A1 | 8/2006 | Iida et al. |
| 2007/0028718 A1 | 2/2007 | Lee et al. |
| 2007/0102211 A1 | 5/2007 | Nozaki et al. |
| 2007/0175723 A1 | 8/2007 | Blessing et al. |
| 2007/0266810 A1 | 11/2007 | Forsyth |
| 2007/0272457 A1 | 11/2007 | Kodama et al. |
| 2008/0099305 A1 | 5/2008 | Ogasawara |
| 2008/0134819 A1 | 6/2008 | Kapp et al. |
| 2008/0202267 A1 | 8/2008 | Hendrickson et al. |
| 2009/0145673 A1 | 6/2009 | Soliman et al. |
| 2010/0031910 A1 | 2/2010 | Seufert et al. |
| 2010/0076657 A1 | 3/2010 | Jinno et al. |
| 2010/0120580 A1 | 5/2010 | Mepham et al. |
| 2011/0098151 A1 | 4/2011 | Ziemer |
| 2011/0113923 A1 | 5/2011 | Pesola et al. |
| 2011/0245033 A1 | 10/2011 | Sato et al. |
| 2011/0265601 A1 | 11/2011 | Pastorello et al. |
| 2011/0290072 A1* | 12/2011 | Xie .................... B60K 6/48 74/665 A |
| 2012/0010041 A1 | 1/2012 | Soliman et al. |
| 2012/0053011 A1 | 3/2012 | Onomura et al. |
| 2012/0160044 A1 | 6/2012 | Kahl |
| 2012/0245781 A1 | 9/2012 | Kanamori et al. |
| 2012/0245783 A1 | 9/2012 | Tamagawa |
| 2012/0303201 A1* | 11/2012 | Tsuneishi .............. B60K 6/547 701/22 |
| 2012/0310461 A1 | 12/2012 | Maruyama et al. |
| 2012/0325048 A1 | 12/2012 | Raisch |
| 2012/0325573 A1 | 12/2012 | Miller |
| 2013/0090202 A1 | 4/2013 | Hiraiwa |
| 2013/0096749 A1 | 4/2013 | Hussain et al. |
| 2013/0096784 A1 | 4/2013 | Kohler et al. |
| 2013/0166118 A1 | 6/2013 | Kim |
| 2013/0192417 A1 | 8/2013 | Fujita et al. |
| 2013/0288854 A1 | 10/2013 | Kobayashi |
| 2013/0345019 A1 | 12/2013 | Kaltenbach et al. |
| 2014/0128205 A1 | 5/2014 | Phillips et al. |
| 2015/0167786 A1 | 6/2015 | Kim |
| 2015/0167803 A1* | 6/2015 | Lee .................... F16H 61/0403 475/5 |
| 2015/0291154 A1 | 10/2015 | Kaltenbach et al. |
| 2016/0084351 A1 | 3/2016 | Lee et al. |
| 2016/0298733 A1 | 10/2016 | Bender et al. |

FOREIGN PATENT DOCUMENTS

| | | |
|---|---|---|
| CN | 102381178 | 3/2012 |
| CN | 102717714 | 10/2012 |
| CN | 202641405 | 1/2013 |
| DE | 10239540 | 3/2004 |
| DE | 102008002381 A1 | 12/2009 |
| DE | 102011086743 A1 | 5/2013 |
| DE | 102011089467 A1 | 6/2013 |
| DE | 102012222122 A1 | 6/2014 |
| EP | 1122109 A2 | 8/2001 |
| EP | 1375241 | 2/2004 |
| EP | 1555184 | 7/2005 |
| EP | 1979185 | 10/2008 |
| EP | 1990229 A2 | 12/2008 |
| EP | 2080637 | 7/2009 |
| EP | 2133252 | 12/2009 |
| EP | 2210758 A1 | 7/2010 |
| EP | 2385270 A1 | 11/2011 |
| EP | 2390127 A1 | 11/2011 |
| EP | 2439094 A1 | 4/2012 |
| EP | 2460704 | 6/2012 |
| EP | 2508378 A1 | 10/2012 |
| EP | 2517938 A1 | 10/2012 |
| EP | 2631103 | 8/2013 |
| EP | 2636554 | 9/2013 |
| EP | 2636566 | 9/2013 |
| EP | 2636567 | 9/2013 |
| EP | 2995477 | 3/2016 |
| EP | 2995487 | 3/2016 |
| JP | H0993714 A | 4/1997 |
| JP | 2001157305 | 6/2001 |
| JP | 2001191814 | 7/2001 |
| JP | 2005133682 | 5/2005 |
| JP | 2010070188 A | 4/2010 |
| JP | 2010076761 A | 4/2010 |
| JP | 2010179789 | 8/2010 |
| JP | 2010281237 | 12/2010 |
| JP | 2012086701 | 5/2012 |
| JP | 2013199909 | 10/2013 |
| KR | 101339264 | 12/2013 |
| WO | WO 99/21263 A2 | 4/1999 |
| WO | WO 2008/092353 A1 | 8/2008 |
| WO | WO 2010/054210 A1 | 5/2010 |

(56) References Cited

FOREIGN PATENT DOCUMENTS

| WO | 2011138308 A1 | 11/2011 |
|---|---|---|
| WO | 2012152613 | 11/2012 |
| WO | WO 2013/014510 A1 | 1/2013 |
| WO | WO 2013/031491 A1 | 3/2013 |
| WO | 2015032346 | 3/2015 |

OTHER PUBLICATIONS

Final Office Action dated Jun. 17, 2016, issued in related U.S. Appl. No. 14/527,600 (19 pages).
Final Office Action dated Jun. 28, 2016, issued in related U.S. Appl. No. 14/527,410 (21 pages).
Notice of Allowance dated Oct. 19, 2016, issued in related U.S. Appl. No. 14/527,446 (7 pages).
Final Office Action dated Oct. 20, 2016, issued in related U.S. Appl. No. 14/527,496 (8 pages).
Notice of Allowance dated Oct. 26, 2016, issued in related U.S. Appl. No. 14/527,600 (19 pages).
Notice of Allowance dated Nov. 1, 2016, issued in related U.S. Appl. No. 14/644,943 (8 pages).
Notice of Allowance dated Nov. 4, 2016, issued in related U.S. Appl. No. 14/527,496 (8 pages).
Notice of Allowance dated Nov. 4, 2016, issued in related U.S. Appl. No. 14/644,818 (7 pages).
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
European Search Report and Written Opinion for Application No. 14880411.5, dated Apr. 11, 2017, 12 pages.
European Search Report and Written Opinion for Application No. 14881104.5, dated May 5, 2017, 8 pages.
Non-Final Office Action for U.S. Appl. No. 14/527,410, dated Jan. 13, 2017, 23 pages.
Non-Final Office Action for U.S. Appl. No. 14/755,540, dated Jan. 26, 2017, 15 pages.
Non-Final Office Action for U.S. Appl. No. 14/755,695, dated May 4, 2017, 6 pages.
Non-Final Office Action for U.S. Appl. No. 14/755,629, dated May 17, 2017, 6 pages.
Non-Final Office Action for U.S. Appl. No. 14/644,881, dated May 19, 2017, 29 pages.
Final Office Action for U.S. Appl. No. 14/755,540, dated May 24, 2017, 11 pages.
Final Office Action for U.S. Appl. No. 14/527,410, dated Jun. 6, 2017, 26 pages.
Final Office Action for U.S. Appl. No. 14/755,540, dated Sep. 19, 2017, 10 pages.
Non-Final Office Action for U.S. Appl. No. 14/527,522, dated Aug. 7, 2017, 11 pages.
Non-Final Office Action for U.S. Appl. No. 14/527,572, dated Aug. 23, 2017, 31 pages.

* cited by examiner

TRANSMISSION UNIT, POWER TRANSMISSION SYSTEM AND VEHICLE COMPRISING THE SAME

CROSS-REFERENCE TO RELATED APPLICATION

This application claims priority to and the benefit of Chinese Patent Application No. 201510024198.1, filed with the State Intellectual Property Office of P. R. China on Jan. 16, 2015. The entire content of the above-identified application is incorporated herein by reference.

FIELD

Embodiments of the present disclosure relate to vehicles, and more particularly to a transmission unit, a power transmission system including the transmission unit, and a vehicle including the power transmission system.

BACKGROUND

To reduce energy consumption, the development and utilization of energy-efficient vehicles have become a trend. As an energy-efficient vehicle, a hybrid vehicle is driven by at least one of an internal combustion engine and a motor that has various operation modes, and consequently may operate with improved transmission efficiency and fuel efficiency.

However, in the related art, the transmission unit in the hybrid vehicle is generally complex in structure, provides fewer transmission modes, and is low in transmission efficiency. Besides, for most hybrid vehicles, the charging process is always carried out during the running of the vehicle. Therefore, a conventional hybrid vehicle has relatively fewer charging modes and charging passage, and lower charging efficiency.

SUMMARY

Embodiments of the present disclosure seek to solve at least one of the problems existing in the prior art to at least some extent.

Embodiments of a first broad aspect of the present disclosure provide a transmission unit. The transmission unit, according to embodiments of the present disclosure, includes: a plurality of input shafts, each of the input shafts being provided with a shift driving gear thereon; a plurality of output shafts, each of the output shafts being provided with a shift driven gear configured to mesh with a corresponding shift driving gear; a reverse output gear, at least one reverse output gear fitted over one of the output shafts; a reverse synchronizer configured to engage with the reverse output gear; a reverse shaft configured to rotate together with one of the input shafts and to rotate together with at least one of the reserve output gears; a motor power shaft; a first motor gear fitted over the motor power shaft; a second motor gear fitted over the motor power shaft and configured to rotate together with one of the shift driven gears; a motor synchronizer disposed on the motor power shaft and between the first and second motor gears.

Embodiments of a second broad aspect of the present disclosure provide a power transmission system including the transmission unit. The power transmission system, including the transmission unit according to embodiments of the present disclosure, includes the above-identified transmission unit and a first motor generator configured to rotate together with the motor power shaft.

Embodiments of a third broad aspect of the present disclosure provide a vehicle. The vehicle, according to embodiments of the present disclosure, includes the above-identified power transmission system for a vehicle.

With the transmission unit and the power transmission, system according to embodiments of the present disclosure, the transmission modes are increased, and various conditions, such as charging the vehicle while parking or charging the vehicle while driving, may be accomplished.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
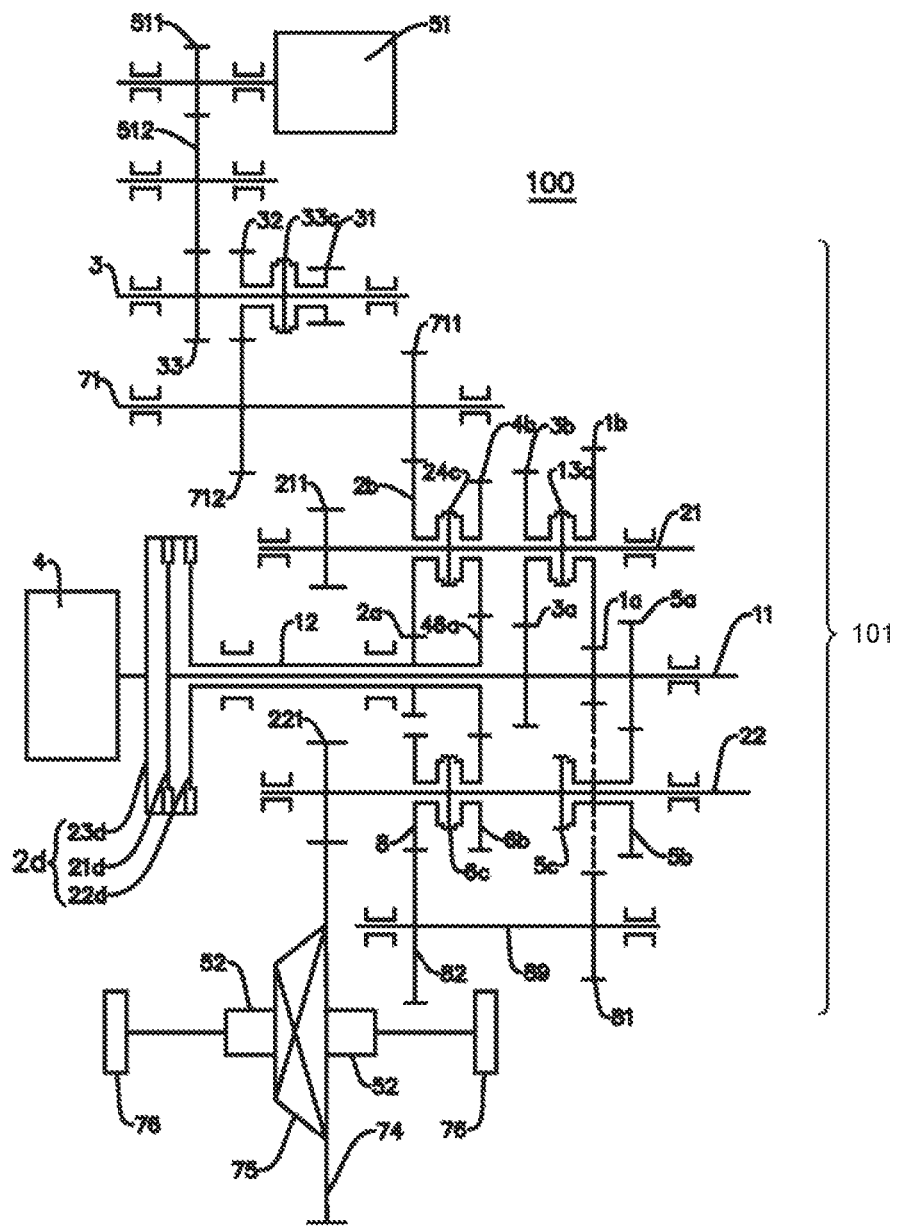
FIG. 1 is a schematic view of an exemplary power transmission system according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two features, unless specified otherwise.

In the present invention, unless specified or limited otherwise, the terms "mounted," "connected," "coupled," "fixed" and the like, are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art, according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

A power transmission system, according to embodiments of the present disclosure, may be described below with reference to FIGS. 1-12. The power transmission system, according to embodiments of the present disclosure, may be used in vehicles such as hybrid vehicles as a power system, which may provide sufficient power and electric power for driving the vehicle.

In some embodiments, a power transmission system 100 may generally include a power unit and a transmission unit. The power unit may be an engine 4, a motor generator, and so on. In some embodiments, the transmission unit 101 may transmit power output from the power unit, thus driving or charging the vehicle.

In some embodiments, as shown in FIGS. 1-12, the power transmission system 100 may include but is not limited to an engine 4, a first motor generator 51 and a transmission unit 101.

In some embodiments, as shown in, for example, FIG. 1, the transmission 101 unit includes a plurality of input shafts (e.g., a first input shaft 11, a second input shaft 12), a plurality of output shafts (e.g. a first output shaft 21, a second output shaft 22), a motor power shaft 3, a plurality of gears provided on related shafts (such as the input shaft, the output shaft, and the motor power shaft), and a gear shift member, such as a synchronizer.

In some embodiments, the engine 4 is configured to selectively engage with at least one of the input shafts when the engine 4 performs power transmission with the input shaft(s). For example, when the engine 4 is transmitting power to the input shaft, the engine 4 may selectively engage with one of the input shafts to transmit power. In some embodiments, the engine 4 may be selectively engaged with two or more of the input shafts simultaneously to transmit power.

In some embodiments, as shown in FIGS. 1-12, the plurality of input shafts include a first input shaft 11 and a second input shaft 12. The engine 4 may selectively engage with one of the first and second input shafts 11, 12 to transmit power. In some embodiments, the engine 4 may engage with the first and second input shafts 11, 12 simultaneously to transmit power. It should be noted that the engine 4 may be disengaged from the first and second input shafts 11, 12 simultaneously.

It is known to a person skilled in the art that the engagement between the engine 4 and the input shaft(s) is related to specific conditions of the power transmission system 100. The engagement between the engine 4 and the input shaft(s) will be described below in detail with reference to detailed embodiments.

In some embodiments, the power transmission between the input shaft(s) and the output shaft(s) is achieved by shaft gear pairs. For example, each of the input shafts has a shaft driving gear provided thereon, each of the output shafts has a shaft driven gear provided thereon, so that a plurality of gear pairs with different velocity ratios are formed by meshes of corresponding shaft driving gears and shaft driven gears.

In some embodiments, the transmission unit may be a six-speed transmission, i.e., the transmission unit may include a first-gear gear pair, a second-gear gear pair, a third-gear gear pair, a fourth-gear gear pair, a fifth-gear gear pair and a sixth-gear gear pair. There are no particular limits in the present disclosure, a person skilled in the art may increase or reduce the number of gear pairs accordingly based on transmission requirements, and the transmission unit may not be limited to the six-speed transmission as disclosed in the present embodiment.

In some embodiments, as shown in FIGS. 1-12, at least one reverse output gear 8 is fitted over one of the output shafts, a reverse synchronizer (for example, a fifth gear synchronizer 5c or a sixth gear synchronizer 6c) is provided to engage with the reverse output gear 8 with the corresponding output shaft. In other words, a reverse synchronizer synchronizes with the corresponding reverse output gear 8 and the output shaft, such that the output shaft may rotate together with the corresponding reverse output gear 8 which is synchronized by the reverse synchronizer, and then reverse power can output from the output shaft.

In some embodiments, as shown in FIGS. 1-7 and FIGS. 9-12, the reverse output gear includes one reverse output gear and the reverse output gear is fitted over the output shaft 22. The present disclosure, however, is not limited to this embodiment. In other embodiments, as shown in FIG. 8, the reverse output gear 8 includes two output gears and the two reverse output gears 8 may be fitted over the second output shaft 22. In some embodiments, the reverse output gear 8 may include three or more output gears.

In some embodiments, the reverse shaft 89 is configured to rotate together with one of the input shafts and also rotate together with at least one reverse output gear 8. In some embodiments, transmitting power can be transmitted to the reverse output gear 8 via the reverse shaft 89, thus reverse power can be output from the reverse output gear 8. In the present embodiment, all of the output gears 8 are fitted over the second output shaft 22, and the reverse shaft 89 may rotate together with the first input shaft 11, for example, reverse power generated by the engine 4 may transmit to the reverse output gear 8 via the first input shaft 11 and the reverse shaft 89.

In some specification of the present disclosure, the expression "rotate together with" means that related components (such as two components) may rotate together. In an embodiment that one component rotates together with the other one component, when the one component rotates, the other one component rotates together.

In some embodiments where a gear rotates together with a shaft, when the gear rotates, the relative gear rotates together; alternatively, when the shaft rotates, the relative gear rotates together.

In some embodiments where one shaft rotates together with the other shaft, when one shaft rotates, the other shaft rotates together.

In some embodiments where one gear rotates together with the other one gear, when the one gear rotates, the other one gear rotates together.

In the following description, the expression "rotate together with" may be understood as described above, unless specified or limited otherwise.

In some embodiments, as shown in FIG. 1-12, the reverse shaft 89 has a gear 81 provided thereon, the gear 81 may mesh with a shaft driving gear, for example, the gear 81 may mesh with a shaft driving gear 1a configured on the first input shaft 11. The present disclosure, however, in not limited to this embodiment.

In some embodiments, a reverse idler gear 82 is fixed on the reverse shaft 89, the reverse idler gear 82 may mesh with the corresponding reverse output gear 8. In some embodiments, as shown in FIGS. 1-7 and FIGS. 9-12, one reverse output gear 8 and one reverse idler gear 82 are employed and may mesh with each other. In some embodiments, as shown in FIG. 8, two reverse output gears 8 and two reverse idler gears 82 are employed, and each of the reverse output gears 8 may mesh with the corresponding reverse idler gear 82, and therefore reverse power transmitted by reverse output gears 8 may be selectively transmitted via one of the two reverse output gears 8. A person skilled in the art may set up the velocity ratio of the two reverse output gears 8 with the corresponding reverse idler gear 82 flexibly, and therefore two proper reverse velocity ratios may be obtained and more options may be provided to reverse the vehicle according to different road conditions.

In some embodiments, as shown in FIGS. 1-12, a reverse output gear 8 is fitted over the output shaft. A reverse synchronizer (for example, a fifth gear synchronizer 5c or a sixth gear synchronizer 6c) is provided to synchronize the reverse output gear 8 with the corresponding output shaft, thus reverse power can output from the output shaft. In some embodiments, the reserve output gear 8 and a shift driven gear (for example, a fifth-gear shift driven gear 5b or a sixth-gear shift driven gear 6b) nearby may share a shift synchronizer. In some embodiments, a reverse output gear 8 and a shift driven gear may arrange on the same output shaft. In other words, a shift driven gear fitted over the output shaft may output power via the output shaft which is being engaged with a shift synchronizer. In the present embodiment, the reverse output gear 8 may be configured near the shift driven gear, such that the output gear 8 and the shift driven gear may share a shift synchronizer. The engaging sleeve of the shift synchronizer may move to the left or to the right so as to engage with the reverse output gear 8 or the corresponding shift driven gear.

Therefore, synchronizers and shift fork mechanisms can be saved, and the power transmission system 100 can have a more compact structure, a smaller axial and diametric size, more convenient to control, and relatively lower cost.

In some embodiments, the reverse synchronizer may be an individual synchronizer independent of the shift synchronizer.

Examples that the reverse synchronizer work as the shift synchronizer will be described below in detail with reference to detailed embodiments.

The details of the motor power shaft 3 of the transmission unit 101 may be described below.

In some embodiments, the first motor gear 31 and the second motor gear 32 are both fitted over the power shaft 3, the first motor gear 31 may mesh with the shift driven gear 74 of a main reducer.

In some embodiments, the second motor gear 32 is configured to rotate together with one of the shift driven gears. According to embodiments of the present disclosure, the second motor gear 32 may rotate together with the corresponding shift driven gear when the vehicle, including the power system 100, is in some specific conditions (will be discussed below with reference to detailed embodiments) in which power needs to be transmitted between the second motor gear 32 and the corresponding shift driven gear.

In some embodiments, as shown in FIGS. 1-12, the second motor gear 32 may rotate together with the second-gear shift driven gear 2b, and the second motor gear 32 may configure to directly mesh with the second-gear shift driven gear 2b or transmit by the transmission components. It will be discussed below with reference to detailed embodiments.

In some embodiments, the motor synchronizer 33c is disposed on the power shaft 3 and between the first motor gear 31 and the second motor gear 32, thus the motor synchronizer 33c may selectively engage with the motor power shaft 3 with one of the first motor gear 31 and the second motor gear 32. In some embodiments, as shown in FIG. 1 the engaging sleeve of the motor synchronizer 33c may move to the left to engage with the second motor gear 32 with the motor power shaft 3. In some embodiments, the engaging sleeve of the motor synchronizer 33c may move to the right to engage with the first motor gear 31.

In some embodiments, the first motor generator 51 may be configured to rotate together with the motor power shaft 3. For example, when functioning as a motor, the first motor generator 51 outputs the power to the motor power shaft 3. In some embodiments, when functioning as a generator, power from the motor power shaft 3 may be transmitted to the first motor generator 51, thereby driving the first motor generator 51 to generate electric power.

In the specification of the present disclosure, a motor generator may be understood as an apparatus which can function as motor and a generator, unless specified or limited otherwise.

In some embodiments, the second motor gear 32 may rotate together with one of the shift driven gears. In some embodiments, when the second motor 32 is rotating corresponding to the one of the shift driven gears, the first motor generator 51 may use at least a part of power output by the engine 4 so as to generate electric power when the vehicle is parking or running.

In some embodiments, when the vehicle is in a running state and the second motor gear 32 is rotating together with one of the shift driven gears, a part of the power output by the engine 4 may be transmitted to the first motor generator 51 via one of the shift driven gears, the second motor gear 32, and the motor power shaft 3, such that the first motor generator 51 is driven to generate electric power, thus accomplish a condition of charging the vehicle while driving the vehicle.

In some embodiments, when the vehicle is in a parking state (e.g., the vehicle stops running but the engine is still working, such as the engine 4 is idling) and the second motor gear 32 is rotating together with one of the shift driven gears, a part of power output by the engine 4 may be transmitted to the first motor generator 51 via one of the shift driven gears, the second motor gear 32, and the motor power shaft 3, such that the first motor generator 51 is driven to generate electric power, thus accomplishing a condition of charging the vehicle while parking (such as charging the vehicle while the vehicle is not running). Therefore, the charging efficiency can be improved significantly, and the fuel economy of the engine 4 can be enhanced.

In some embodiments, the first motor gear 31 may mesh with the shift driven gear 74, such that power generated by the first motor generator 51 can transmit to the first motor gear 31 via the engaging of the motor synchronizer 33c (engaging with the first motor gear 31). So that, the transmission chain is shorter, the number of transmission components is less, and the transmission efficiency is higher.

In some embodiments, the motor power shaft 3 may be a motor shaft of the first motor generator 51. In some embodiments, the motor power shaft 3 may be a shaft different from the motor shaft of the first motor generator 51.

With the power transmission system 100 according to embodiments of the present disclosure, a number of charging modes of the vehicle are increased. For example, it is possible for charging the vehicle when the vehicle is running and parking. Therefore, deficiencies such as single charging mode and low charging efficiency of a conventional power transmission system may be solved to some extent, in other words, the charging modes of the vehicle are expanded.

The detailed configuration of the transmission unit 101 may be described in detail below with reference to detailed embodiments in FIGS. 1-12.

In the following, the motor power shaft 3, the shift driven gears and transmission method thereof will be described below in detail with references to detailed embodiments.

In some embodiments, as shown in FIGS. 1-4, the power transmission system 100 includes an idler shaft 71, the first idler gear 711, and the second idler gear 712, are fixed on the idler shaft 71. The first idler gear 711 may mesh with one of the shift driven gears (for example, a second-gear shift driven gear 2b). The second idler gear 712 may mesh with the second motor gear 32. In some embodiments, the second motor gear 32 may rotate together with one of the shift driven gears via the first idler gear 711 and the second idler gear 712.

Figure 5:
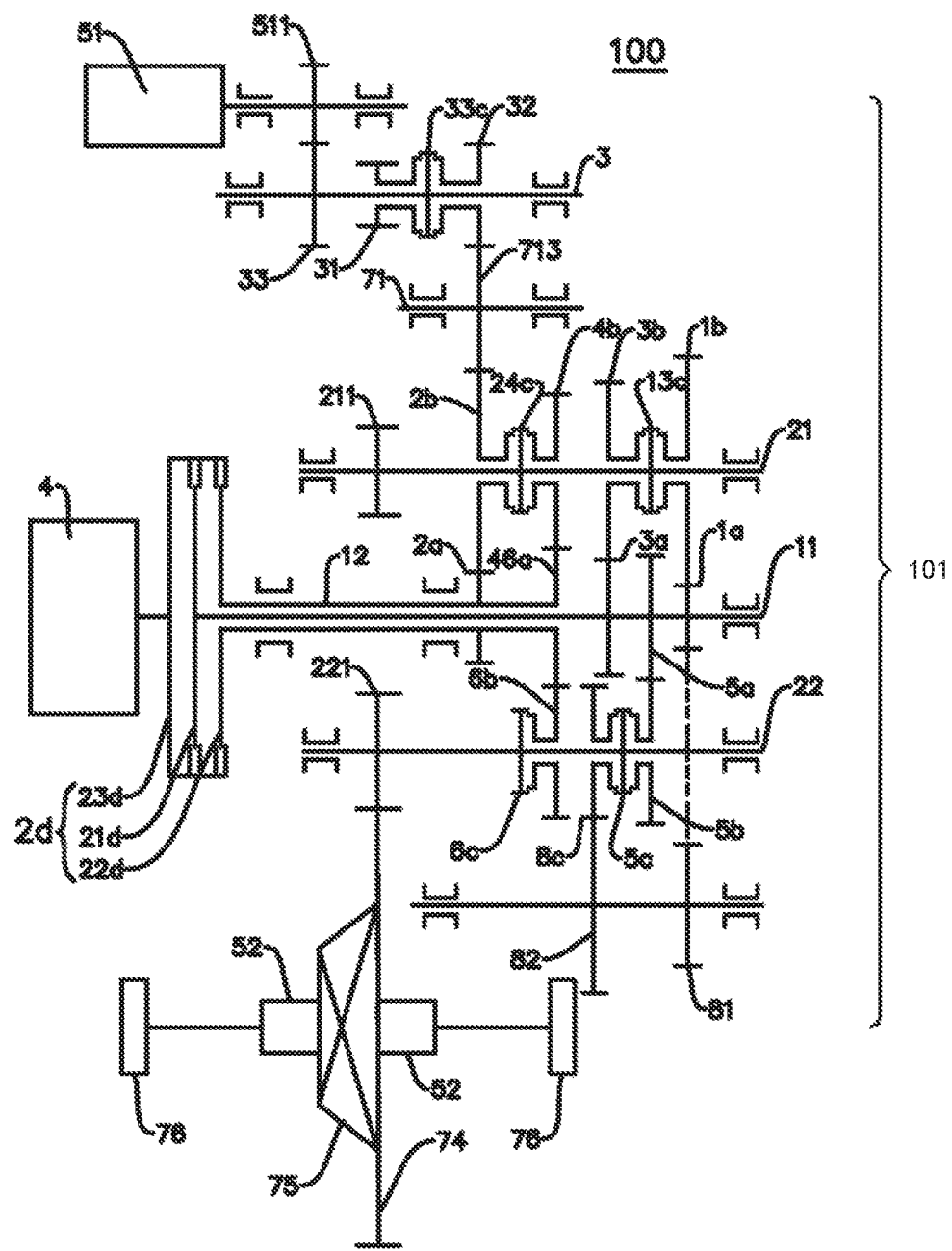
FIG. 5 is a schematic view of an exemplary power transmission system according to an embodiment of the present disclosure.

In some embodiments, as shown in FIG. 5, the third idler gear 713 is fixed on the idler shaft 71, the second motor gear 32 may transmit to one of the shift driven gears (for example, a second-gear shift driven gear 2b) by the third idler gear 713.

Figure 6:
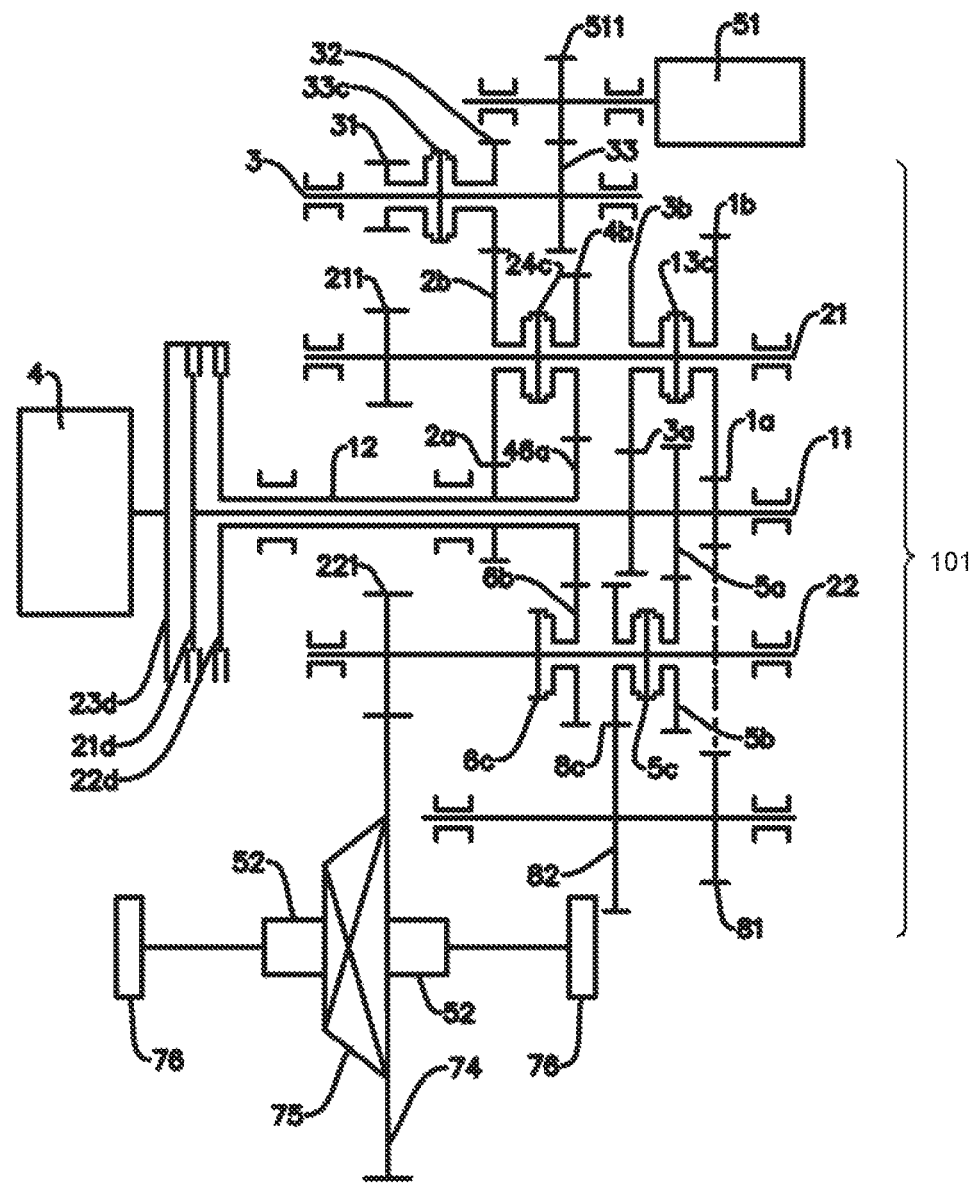
FIG. 6 is a schematic view of an exemplary power transmission system according to an embodiment of the present disclosure.
Figure 7:
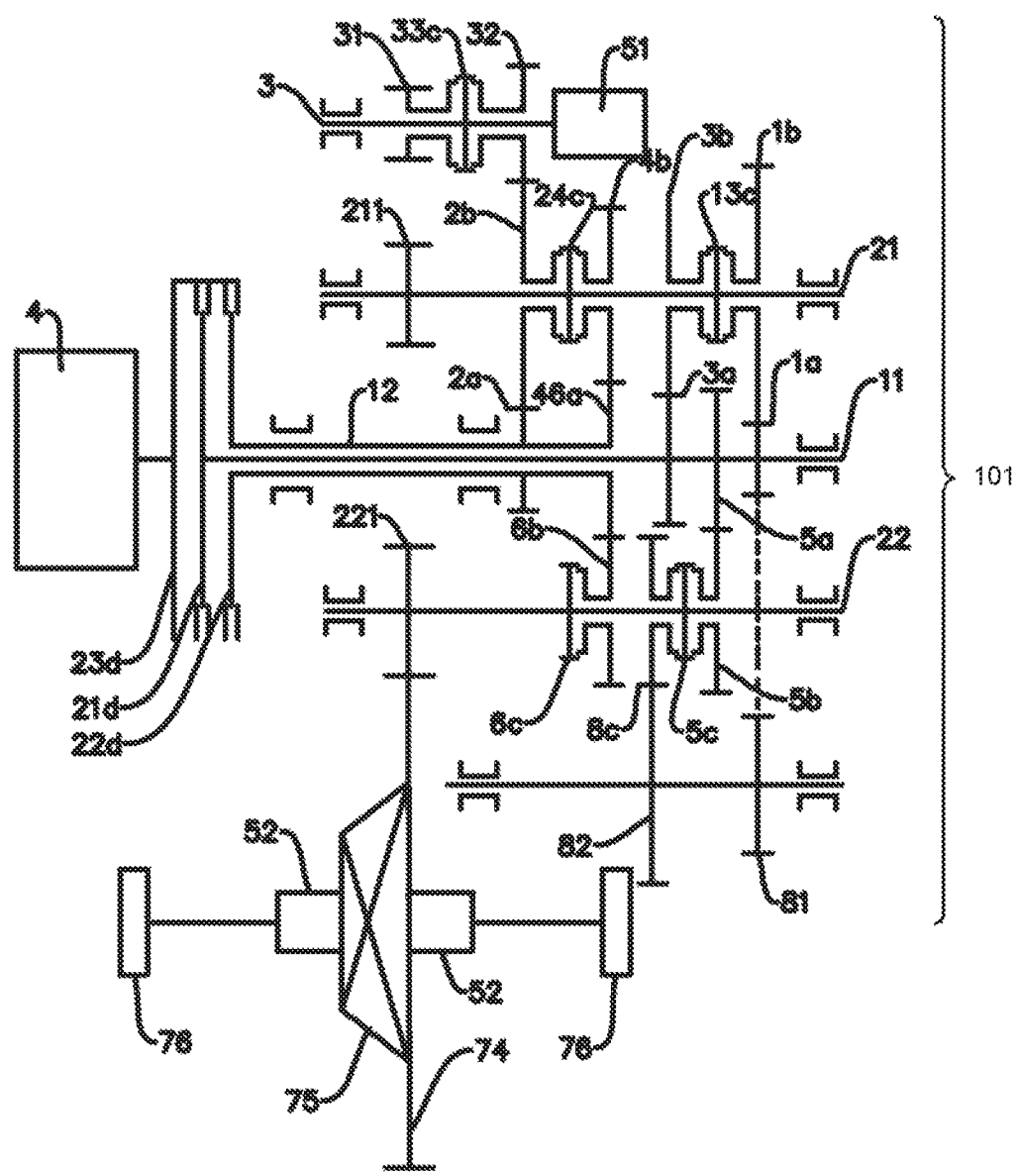
FIG. 7 is a schematic view of an exemplary power transmission system according to an embodiment of the present disclosure.
Figure 8:
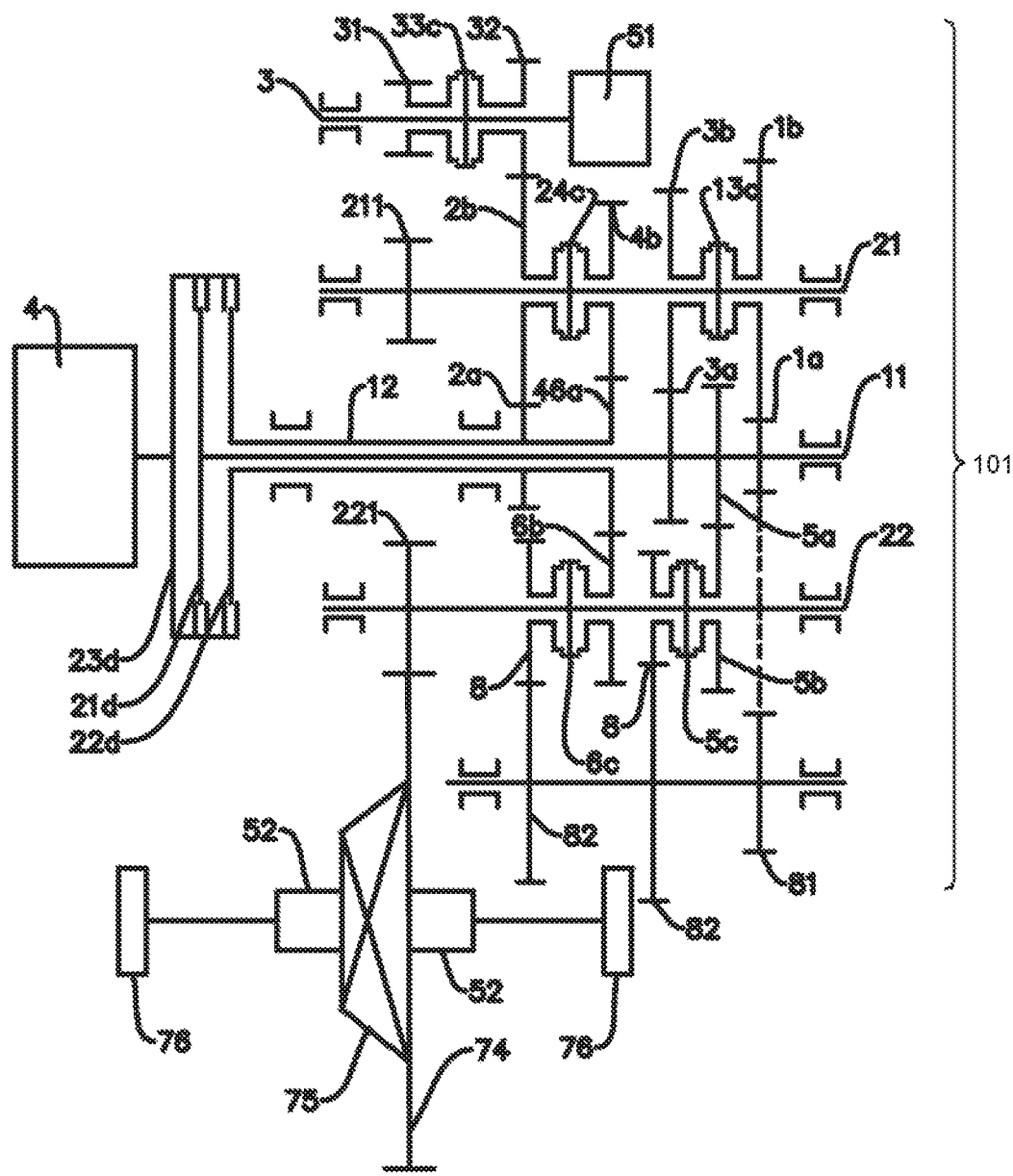
FIG. 8 is a schematic view of an exemplary power transmission system according to an embodiment of the present disclosure.

In some embodiments, as shown in FIGS. 6-8, the second motor gear 32 may directly mesh with one of the shift driven gears (for example, a second-gear shift driven gear 2b).

The transmission method between motor power shaft 3 and the first motor generator 51 will be described below in detail with references to detailed embodiments.

In some embodiments, as shown in FIGS. 1-6, the third motor gear 33 is fixed on the motor power shaft 3, and the first motor generator 51 may configure to directly mesh with the third motor gear 33, or the first motor generator 51 may perform power transmission with the third motor gear 33 indirectly.

In some embodiments, as shown in FIGS. 1-4, the first generator gear 511 may configure on the shaft of the first generator gear 511. The first generator gear 511 may transmit to the third motor gear 33 via the idler gear 512.

In some embodiments, as shown in FIGS. 7 and 8, the first motor generator 51 may be coaxially connected with the motor power shaft 3.

The input shaft(s), the output shaft(s), the shift driving gears and the shift driven gears of the power transmission system 100 will be described below with reference to embodiments shown in FIGS. 1-12.

In some embodiments, as shown in FIGS. 1-12, two input shafts are provided. In the present embodiment, the plurality of input shafts includes a first input shaft 11 and a second input shaft 12. The second input shaft 12 may be hollow and the first input shaft 11 may be solid. One part of the first input shaft 11 may be inserted within the second input shaft 12, and the other part of the first input shaft 11 may extend out of the second input shaft 12 along an axial direction of the second input shaft 12. The first input shaft 11 and the second input shaft 12 may be arranged coaxially.

In some embodiments, two output shafts are provided. In the present embodiment, the plurality of output shafts may include a first output shaft 21 and a second output shaft 22. The first output shaft 21 and the second output shaft 22 may be arranged coaxially with the input shafts (such as the first input shaft 11 and the second input shaft 12). Both the first output shaft 21 and the second output shaft 22 may be solid.

In some embodiments, the power transmission system 100, according to embodiments of the present disclosure, may have six gear transmission types. Specifically, odd-numbered gear shift driving gears may be arranged on the first input shaft 11, while even-numbered gear shift driving gear may be arranged on the second input shaft 12. The first input shaft 11 may transmit power from gear pairs of odd-numbered gears, and the second input shaft 12 may transmit power from gear pairs of even-numbered gears.

In some embodiments, as shown in FIGS. 1-12, a first-gear shift driving gear 1a, a third-gear shift driving gear 3a, and a fifth-gear shift driving gear 5a, may be arranged on the first input shaft 11, and a second-gear shift driving gear 2a, and a fourth-sixth-gear shift driving gear 46a may be arranged on the second input shaft 12. Each of the first-gear to fourth-sixth-gear shift driving gears 1a, 2a, 3a, 46a, and 5a may rotate together with a corresponding input shaft.

In some embodiments, as shown in FIG. 1 and FIGS. 3-12, a first-gear shift driven gear 1b, a second-gear shift driven gear 2b, a third-gear shift driven gear 3b and a fourth-gear shift driven gear 4b, may be disposed on the first output shaft 21, and a fifth-gear shift driven gear 5b and a sixth-gear shift driven gear 6b may be disposed on the second output shaft 22. Each of the shift driven gears 1b, 2b, 3b, 4b, 5b, and 6b may be fitted over a corresponding output shaft. Each of the shift driven gears and the corresponding output shafts thereof may rotate at different speeds.

In some embodiments, the first-gear shift driving gear 1a may mesh with the first-gear shift driven gear 1b to form one gear pair, the second-gear shift driving gear 2a may mesh with the second-gear shift driven gear 2b to form one gear pair, the third-gear shift driving gear 3a may mesh with the second-gear shift driven gear 3b to form one gear pair, the fourth-sixth-gear shift driving gear 46a may mesh with the fourth-gear shift driven gear 4b to form one gear pair, the fifth-gear shift driving gear 5a may mesh with the fifth-gear shift driven gear 5b to form one gear pair, and the fourth-and-sixth-gear shift driving gear 46a may mesh with the fifth-gear shift driven gear 6b to form one gear pair and six pairs of gear pairs can be formed.

In the present embodiment, the fourth-gear gear pair and the sixth-gear gear pair share the fourth-sixth shift driving gear 46a, so that the number of shift driving gears can be reduced to make the power transmission system 100 have a more compact structure.

As the shift driven gear is fitted over the corresponding output shaft, a synchronizer is provided to synchronize the shift driven gear and the corresponding output shaft, thus achieving the object of power transmission.

In some embodiments, as shown in FIG. 1 and FIGS. 3-12, the power transmission system 100 includes a first-third gear synchronizer 13c, a second-fourth gear synchronizer 24c, a fifth gear synchronizer 5c, and a sixth gear synchronizer 6c.

In some embodiments, as shown in FIG. 1, the first-third gear synchronizer 13c is disposed on the first output shaft 21 and between the first-gear shift driven gear 1b and the third-gear shift driven gear 3b. The first-third gear synchronizer 13c may engage with the first-gear shift driven gear 1b with the first output shaft 21 or engage with the third-gear shift driven gear 3b with the first output shaft 21, and the shift driven gear may rotate together with the corresponding output shaft, e.g., the first-gear shift driven gear 1b and the first output shaft 21 may rotate together, and the third-gear shift driven gear 3b and the first output shaft 21 may rotate together.

In some embodiments, as shown in FIG. 1, the first-third gear synchronizer 13c includes an engaging sleeve. In some embodiments, the engaging sleeve of the first-third gear synchronizer 13c may move to the left so as to engage the third-gear shift driven gear 3b with the first output shaft 21, such that the third-gear shift driven gear 3b and the first output shaft 21 may rotate together. In some embodiments, the engaging sleeve of the first-third gear synchronizer 13c may move to the right so as to engage first-gear shift driven gear 1b with the first output shaft 21, such that the first-gear shift driven gear 1b and the first output shaft 21 may rotate together.

In some embodiments, as shown in FIG. 1, the second-fourth gear synchronizer 24c is disposed on the first output shaft 21 and between the second-gear shift driven gear 2b and the fourth-gear shift driven gear 4b. The second-fourth gear synchronizer 24c may engage with the second-gear shift driven gear 2b with the first output shaft 21 or engage with the fourth-gear shift driven gear 4b with the first output shaft 21, such that the shift driven gear may rotate together with the corresponding output shaft, e.g., the second-gear shift driven gear 2b and the first output shaft 21 may rotate together, and the fourth-gear shift driven gear 4b and the first output shaft 21 may rotate together.

In some embodiments, as shown in FIG. 1, the second-fourth gear synchronizer 24c includes an engaging sleeve. In some embodiments, the engaging sleeve of the second-fourth gear synchronizer 24c may move to the left so as to engage with the second-gear shift driven gear 2b with the first output shaft 21, such that the second-gear shift driven gear 2b and the first output shaft 21 may rotate together. In some embodiments, the engaging sleeve of the second-fourth gear synchronizer 24c may move to the right so as to engage fourth-gear shift driven gear 4b with the first output shaft 21, such that the fourth-gear shift driven gear 4b and the first output shaft 21 may rotate together.

In some embodiments, as shown in FIG. 1, the fifth gear synchronizer 5c is disposed on the second output shaft 22 and located on one side, such as the left side, of the fifth-gear shift driven gear 5b. The fifth gear synchronizer 5c may engage with the fifth-gear shift driven gear 5b with the second output shaft 22. In some embodiments, the fifth gear synchronizer 5c includes an engaging sleeve, the engaging sleeve of the fifth gear synchronizer 5c may move to the right so as to engage with the fifth-gear shift driven gear 5b with the second output shaft 22, such that the fifth-gear shift driven gear 5b and the second output shaft 22 may rotate together.

In some embodiments, as shown in FIG. 1, the sixth gear synchronizer 5c is disposed on the second output shaft 22 and located on one side, such as the left side, of the sixth-gear shift driven gear 6b. The sixth gear synchronizer 6c may engage with the sixth-gear shift driven gear 6b with the second output shaft 22. In some embodiments, the sixth gear synchronizer 6c includes an engaging sleeve, the engaging sleeve of the sixth gear synchronizer 6c may move to the right so as to engage with the sixth-gear shift driven gear 6b with the second output shaft 22, such that the sixth-gear shift driven gear 6b and the second output shaft 22 may rotate together.

Figure 2:
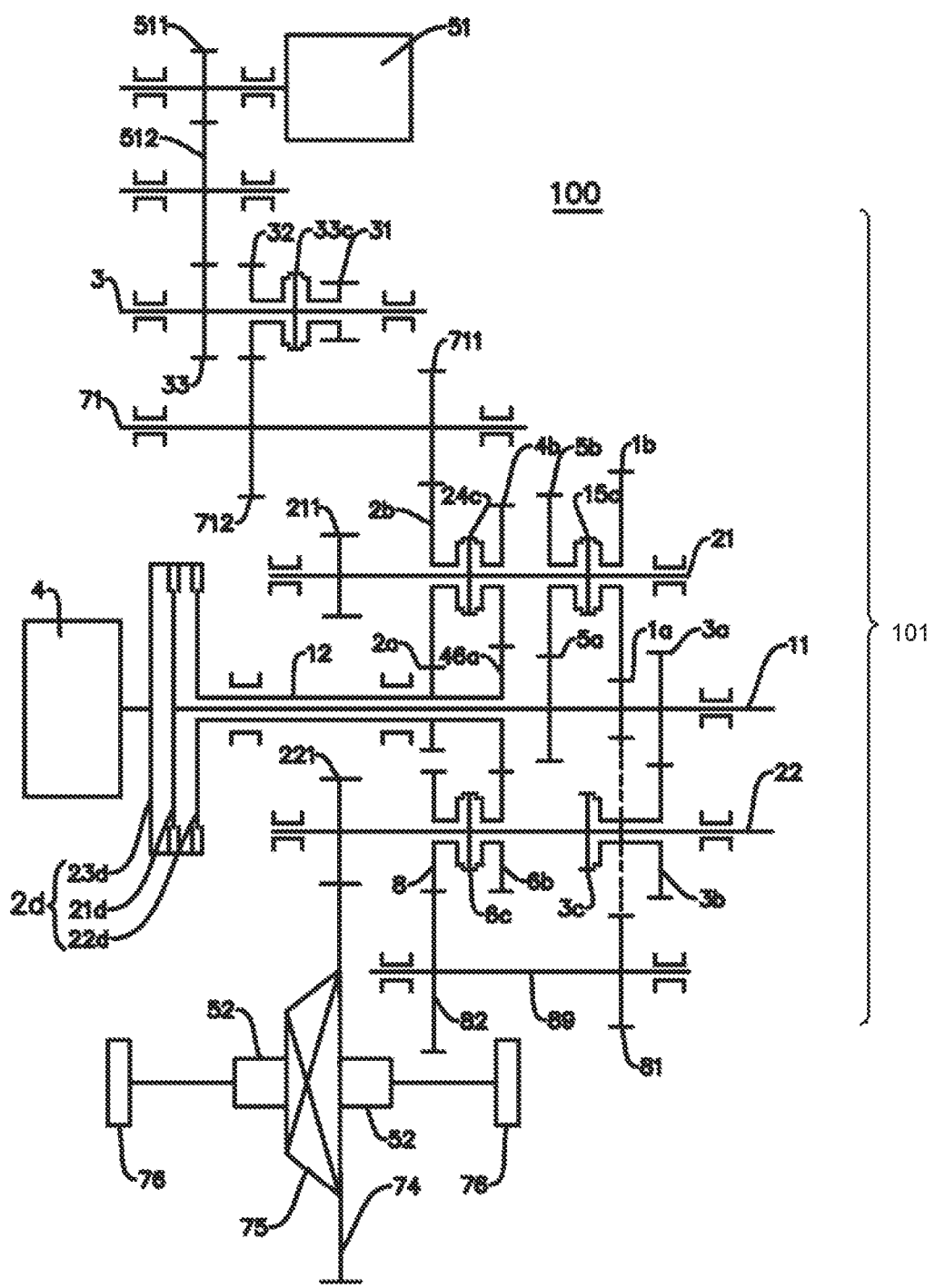
FIG. 2 is a schematic view of an exemplary power transmission system according to an embodiment of the present disclosure.
Figure 3:
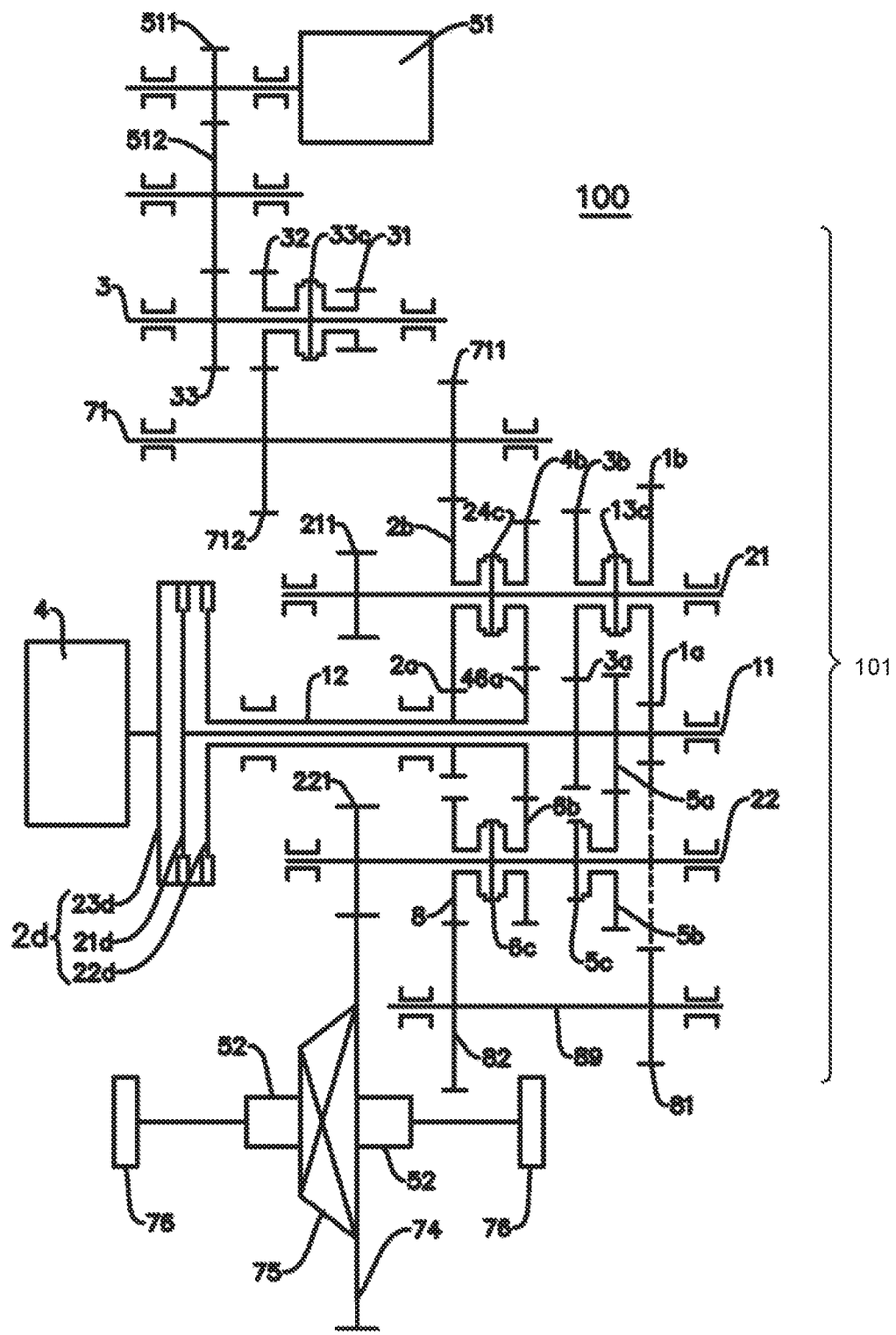
FIG. 3 is a schematic view of an exemplary power transmission system according to an embodiment of the present disclosure.

In some embodiments, as shown in FIG. 1-3, there may configure one reverse output gear 8 and share a sixth gear synchronizer 6c with a sixth-gear shift driven gear 6b. In some embodiments, as shown in FIG. 1-3, the engaging sleeve of the sixth gear synchronizer 6c may move to the left to engage with the reverse output gear 8, and may move the right to engage with the sixth-gear shift driven gear 6b.

In some embodiments, as shown in FIGS. 4-7, there may configure one reverse output gear 8 and share a fifth gear synchronizer 5c with a fifth-gear shift driven gear 5b. In some embodiments, as shown in FIGS. 1-3, the engaging sleeve of the fifth gear synchronizer 5c may move to the left to engage with the reverse output gear 8, and may move the right to engage with the fifth-gear shift driven gear 5b.

In some embodiments, as shown in FIG. 8, there may configure two reverse output gears 8. One reverse output gear 8 share a fifth gear synchronizer 5c with a fifth-gear shift driven gear 5b. The other reverse output gear 8 share a sixth gear synchronizer 6c with a sixth-gear shift driven gear 6b. The fifth gear synchronizer 5c and the sixth gear synchronizer 6c are both reverse synchronizers.

In some embodiments, as shown is FIG. 2, the first-gear shift driven gear 1b, the second-gear shift driven gear 2b, the fourth-gear shift driven gear 4b and the fifth-gear shift driven gear 5b are fitted on the first output shaft 21. The third-gear shift driven gear 3b and the sixth-gear shift driven gear 6b are fitted on the second output shaft 22. In some embodiments, the fifth-gear shift driven gear 5b exchange the output shaft with the third-gear shift driven gear 3b.

In some embodiments, as shown in FIG. 2, a first-fifth gear synchronizer 15c may arrange between the first-gear shift driven gear 1b and the fifth-gear shift driven gear 5b. A third gear synchronizer 3c may configure on one side of the third-gear shift driven gear 3b.

In some embodiments, as shown is FIG. 2, there may configure one reverse output gear 8 and share a sixth gear synchronizer 6c with a sixth-gear shift driven gear 6b, such that the sixth gear synchronizer 6c may be configured as a reverse synchronizer. In some embodiments, there may configure one reverse output gear 8 and share a third gear synchronizer 3c with a third-gear shift driven gear 3b, such that the third gear synchronizer 3c may be configured as a reverse synchronizer. In some embodiments, there may configure two reverse output gears 8. One reverse output gear 8 share a third gear synchronizer 3c with a third-gear shift driven gear 3b. The other reverse output gear 8 share a sixth gear synchronizer 6c with a sixth-gear shift driven gear 6b. The third gear synchronizer 3c and the sixth gear synchronizer 6c are both reverse synchronizers.

In some embodiments, as shown is FIG. 1, the distance between the fifth-gear shift driving gear 5a and the engine 4, the distance between the first-gear shift driving gear 1a and the engine 4, and the distance between the third-gear shift driving gear 3a and the engine 4 are in order from large to small. In some embodiments, as shown is FIG. 2, the distance between the third-gear shift driving gear 3a and the engine 4, the distance between the first-gear shift driving gear 1a and the engine 4, and the distance between the fifth-gear shift driving gear 5a and the engine 4 are in order from large to small. In some embodiments, as shown in FIGS. 3-8, the distance between the first-gear shift driving gear 1a and the engine 4, the distance between the fifth-gear shift driving gear 5a and the engine 4, and the distance between the third-gear shift driving gear 3a and the engine 4 are in order from large to small.

In some embodiments of the present disclosure, the engine 4 may transmit power to, or disengage from, the first input shaft 11 and the second input shaft 12 via a dual clutch 2d.

In some embodiments of the present disclosure, as shown in FIGS. 1-12, the dual clutch 2d includes an input terminal 23d, a first output terminal 21d and a second output terminal 22d. The engine 4 is connected with the input terminal 23d of the dual clutch 2d. In some embodiments, the engine 4 is connected with the input terminal 23d by at least one selected from a group consisting of a flywheel, a damper, a torsional disk, etc.

In some embodiments, the first output terminal 21d is connected with the first input shaft 11, such that the first output terminal 21d and the first input shaft 11 may rotate together. In some embodiments, the second output terminal 22d is connected with the second input shaft 12, such that the second output terminal 22d and the second input shaft 12 may rotate together.

In some embodiments, the input terminal 23d may include a shell of the dual clutch 2d, and each of the first output terminal 21d and the second output terminal 22d may include one driven disk of the dual clutch 2d. In some embodiments, the shell is disengaged from the driven disk, i.e., the input terminal 23d is disengaged from the first output terminal 21d and is disengaged from the second output terminal 22d. When the shell is to be engaged with one driven disk, the shell can be controlled to engage with a corresponding driven disk, thus the shell and this driven disk may rotate together. In the present embodiment, the input terminal 23d may engage with one of the first output terminal 21d and the second output terminal 22d to transmit power from the input terminal 23d to one of the first output terminal 21d and the second output terminal 22d, to output the transmitted power.

In some embodiments, the shell may be engaged with two driven disks simultaneously. In the present embodiment, the input terminal 23d is engaged with both the first output terminal 21d and the second output terminal 22d, and thereby power from the input terminal 23d may be transmitted to the first output terminal 21d and the second output terminal 22d so as to be output.

A person with ordinary skill in the art will appreciate that the engaging state of the dual clutch 2d may be controlled according to practical condition, and that the engaging state may also be adjusted accordingly based on a current transmission mode. In some embodiments, the input terminal 23d may disengage from the two output terminals including, for example, the first output terminal 21d and the second output terminal 22d. In some embodiments, the input terminal 23d may engage with at least one of the two output terminals including, for example, the first output terminal 21d and the second output terminal 22d.

In some embodiments, the power transmission system 100 further includes three power output shafts, i.e., a first output shaft 21, a second output shaft 22, and a motor power shaft 3. These power output shafts, a differential 75, and relationships therebetween may be described below in detail with reference to FIGS. 1-12.

In some embodiments, the differential 75 may be disposed between a pair of front wheels 76 of the vehicle. In some embodiments, the differential 75 may be disposed between a pair of rear wheels 77 of the vehicle. The differential 75 may drive the wheels to the left or to the right when the vehicle is turning or running on a rough road, such that the wheels may roll with different angular speeds, and therefore driving wheels at both sides of the vehicle may perform only rolling on the ground. In some embodiments, a shift driven gear 74 of a main reducer may be disposed on the differential 75, for example, the shift driven gear 74 may be disposed on a shell of the differential 75. In some embodiments, the shift driven gear 74 may be a bevel gear, without particular limits in the present disclosure.

In some embodiments, a first shift driven gear 211 is fixed on the first output shaft 21 and is configured to rotate with the first output shaft 21 synchronously. The first shift driven gear 211 may mesh with the shift driven gear 74, thus transmitting power transmitted to the first output shaft 21 from the first output gear 211 to the shift driven gear 74 and the differential 75.

In some embodiments, a second shift driven gear 221 is fixed on the second output shaft 22 and configured to rotate with the second output shaft 22 synchronously. The second shift driven gear 221 may mesh with the shift driven gear 74, thus transmitting power transmitted to the second output shaft 22 from the second output gear 221 to the shift driven gear 74 and the differential 75.

In some embodiments, as the first motor gear 31 may output the power transmitted to the motor power shaft 3, the first motor gear 31 may mesh with the shift driven gear 74.

The power transmission system 100 according to embodiments of the present disclosure may be used in various different conditions, such as a parking-charging condition (for example, charging the vehicle while the vehicle is parking), a running-charging condition (for example, charging the vehicle while the vehicle is running and both clutch parts of dual clutch 2d are engaged), and the reverse mode.

In the parking-charging condition, the engine 4 is configured to generate power and output the power to one of the shift driven gears, for example, a shift driven gear rotating together with the second motor gear 32, and the motor synchronizer 33c synchronizes the second motor gear 32, such as the shift driven gear to transmit the power to the first motor generator 51, thereby driving the first motor generator 51 to generate electric power.

In some embodiments, as shown in FIG. 1, in the parking-charging state, the engine 4 generates power and transmits the power to the second input shaft 12 via the dual clutch 2d. The motor synchronizer 33c may engage with the second motor gear 32, and therefore the power generated by the engine 4 may be transmitted to the first motor generator 51 via the second input shaft 12, the second-gear gear pair, the first idler gear 711, the idler shaft 71, the second idler gear 712, the second motor gear 32, the motor synchronizer 33c, the motor power shaft 3, the third motor gear 33, the idler gear 512 and the first generator gear 511 sequentially. The first motor generator 51 may be driven to generate electric power as a generator.

Therefore, charging the vehicle when the vehicle is parking may be achieved, and the number of charging modes is increased. In the parking-charging mode, the vehicle is not running, all power from the engine 4 may be used to charge the vehicle, thus providing a fast charging performance and enhancing the charging efficiency.

In the running-charging condition, the input terminal 23d is engaged with the first output terminal 21d and engaged with the second output terminal 22d simultaneously, a part of power generated by the engine 4 may be output to one of the output shafts to drive the wheels of the vehicle, and the other part of power may be transmitted to the first motor generator 51 via the second motor gear 32, thus driving the first motor generator 51 to generate electric power.

In the running-charging condition, as shown in FIG. 1, the motor synchronizer 33c may engage with the second motor gear. A part of power generated by the engine 4 may be transmitted to the first input shaft 11, and then output from the first-gear gear pair, the third-gear gear pair or the fifth-gear gear pair. The other part of power generated by the engine 4 may be transmitted to the first motor generator 51 via the second input shaft 12, the second-gear gear pair and the second motor gear 32 sequentially, thus driving the first motor generator 51 to generate electric power.

It is known to those skilled in the art that, a conventional dual clutch generally have two gear parts, and only one gear part is used when the dual clutch is working. In the power transmission system 100 according to embodiments of the present disclosure, however, two gears parts of the dual clutch 2d may be both engaged (for example, the input terminal 23d is engaged with the first output terminal 21d and engaged with the second output terminal 22d simultaneously) when the dual clutch 2d is working. In the present embodiment, a part of power from the engine 4 may be output to wheels of the vehicle via one output shaft to drive the vehicle to run, and the other part of power from the engine 4 may be transmitted to the first motor generator 51 to drive the first motor generator 51 to generate electric power. In this way, transmission modes of the vehicle are increased, and charging the vehicle while the vehicle is running may be achieved.

In the power transmission system 100 according to embodiments of the present disclosure, a mechanical reverse mode, an electric reverse mode and a hybrid (both mechanic and electric) reverse mode may be achieved.

In the mechanical reverse mode, the reverse of the vehicle is accomplished with power from the engine 4. Specifically, the engine 4 generates power and transmits the power to the reverse shaft 89, and then the power transmits to one of the reverse output gears 8 via a synchronization of the reverse synchronizer (synchronizing one of the reverse output gears 8).

In the mechanical reverse mode, as shown in FIG. 1, the sixth gear synchronizer 6c may engage with the reverse output gear 8. Power generated by the engine 4 can be transmitted to the reverse output gear 8 via the first input shaft 11 and the reverse shaft 89. The reverse output gear 8 is engaged with the sixth gear synchronizer 6c, thus the power of reverse can be outputted by the second output shaft 22.

In the mechanical reverse mode, as shown in FIG. 1, only the sixth gear synchronizer 6c may engage with the reverse output gear 8. In some embodiments as shown in FIG. 8, the sixth gear synchronizer 6c or the fifth gear synchronizer 5c is configured to selectively engage with a corresponding reverse output gear 8, such as to output reverse power.

In the electric reverse mode, the reverse of the vehicle can be enabled with power from the first motor generator 51. Specifically, the first motor generator 51 may generate power and transmit the power to the first motor gear 31 via a synchronization of the motor synchronizer 33c disposed on the motor power shaft 3 (e.g., by synchronizing with the first motor gear), thus enabling the vehicle to reverse.

In the electric reverse mode, as shown in FIG. 1, the motor synchronizer 33c may engage with the first motor gear 31, the power output by the first motor generator 51 may transmit to the first motor gear 31 via the first generator gear 511, the idler gear 512 the third motor gear 33, the motor power shaft 3 and the motor synchronizer 33c.

In the electric reverse mode according to embodiments of the present disclosure, the transmission chain is shorter, the number of transmission components is less, and the reverse efficiency is higher. This passage can be regarded as the direct reverse passage of the first motor generator 51.

In the electric reverse mode according to embodiments of the present disclosure, only the motor synchronizer 33c may engage with the first motor gear 31.

In the hybrid reverse mode, the reverse of the vehicle may be achieved with the engine 4 and the first motor generator 51. The hybrid reverse mode may be a combination of the above mechanical reverse mode and the electric reverse mode.

In the hybrid reverse mode, the engine 4 may generate first power and transmit the first power to the reverse shaft 89, and then the first power may be transmitted to one of the reverse output gears 8 via a synchronization of the reverse synchronizer (synchronizing one of the reverse output gears 8).

In addition, the first motor generator 51 may generate second power and transmit the second power to the first motor gear 31 via a synchronization of the motor synchronizer 33c (synchronizing the first motor gear 31).

In some embodiments, as shown in, for example, FIG. 1, when the power transmission system 100 in the hybrid reverse mode, combines the above mechanical reverse mode and the electric reverse mode. The engine 4 may transmit the first power to the reverse output gear 8, as the above mechanical reverse mode described. The first motor generator 51 may transmit the second power to the first motor gear 31 as the above electric reverse mode described. The first power and the second power may be coupled together before being output to the wheels. In some embodiments, the first power and the second power may be coupled at a shift driven gear 74 of a main reducer of the vehicle, and the coupled power may be transmitted to the wheels so as to reverse the vehicle.

In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

In the hybrid reverse mode according to embodiments of the present disclosure, the motor synchronizer 33c may engage with the first motor gear 31 and the reverse synchronizer 6c engage with the reverse output gear 8.

As described, with the power transmission system 100 according to embodiments of the present disclosure, three reverse modes including the mechanical reverse mode, the electric reverse mode and the hybrid reverse mode may be achieved, thus increasing the reverse modes and facilitating a user to shift within the three reverse modes according to a practical condition, and therefore different driving requirements may be satisfied.

When the vehicle has sufficient electric power, the electric reverse mode may be used. In the electric reverse mode, harmful exhaust gases can be minimized, and the energy consumption can be reduced. It is known to those skilled in the art that an unskilled driver will take longer time and more maneuvers to park the vehicle at a predetermined position. Considering that the engine 4 may generate more harmful gases during a low-speed reverse process and that the engine 4 has relatively higher fuel consumption, because the engine is at an uneconomical rotating speed during the reverse process, the electric reverse mode of the present disclosure is highly effective in reducing fuel consumption during such a low-speed reverse process. In addition, with the generator being used as a power source, harmful exhaust gases can be minimized, and the energy consumption in a low-speed reverse process can also be decreased. Therefore, the fuel economy of the engine 4 may be enhanced.

When the vehicle has insufficient or relatively less electric power, the mechanical reverse mode may be used. In a case where the vehicle needs to be reversed quickly or that the vehicle needs to be reversed with a larger power, the hybrid reverse mode may be used, thus enhancing the power of the vehicle and providing better driving experience to the user.

It should be noted that the above three reverse mode being applied in specific cases may be schematic examples provided for better understanding the present disclosure, which may not be construed that the described reverse mode should be applied when the vehicle is in the corresponding case. It is well known to those skilled in the art that, in a specific condition, a corresponding reverse mode may be selected according to specific requirements and a practical condition.

With the power transmission system 100 according to embodiments of the present disclosure, a number of the reverse modes of the vehicle are increased, which provide a driver more options to reverse the vehicle. In this way, the driver may be provided more driving fun and reverse of the vehicle in different road conditions may be satisfied.

In some embodiments, with reference to FIGS. 1-12, the power transmission system 100 further includes a second motor generator 52. With the second motor generator 52, the power of the power transmission system 100 may be improved, and more transmission modes can be provided.

In some embodiments, the second motor generator 52 may perform power transmission with the shift driven gear 74 of the main reducer. For example, a gear may be disposed on a motor shaft of the second motor generator 52, and the gear is configured to directly mesh with the shift driven gear 74 so as to perform power transmission. In some embodiments, the second motor generator 52 is configured to connect with the first input shaft 11 or the first output shaft 21. In some embodiments, the second motor generator 52 may be integral with the differential 75. In some embodiments, the engine 4 and the first motor generator 51 are configured to drive front wheels of the vehicle, and the second motor generator 52 may be a wheel-side motor and configured to drive rear wheels. In some embodiments, the second motor generator 52 may drive the pair of rear wheels via a reducing mechanism. In some embodiments, two second motor generators 52 are provided, and each second motor generator 52 is configured to drive one rear wheel via a reducing mechanism.

In some embodiments, as shown in FIGS. 9-12, the power transmission system 100 may include an electric differential lock unit. The electric differential lock unit may lock a pair of driving wheels when the vehicle is skidding, thus enhancing the antiskid performance and the pass performance of the vehicle.

In some embodiments, as shown in FIGS. 9-12, the electric differential lock unit may include a third motor generator 201, a fourth motor generator 301 and an antiskid synchronizer 503. The engine 4 and/or the first motor generator 51 is configured to drive a first pair of wheels 76, the third motor generator 201 and the fourth motor generator 301 are configured to drive a second pair of wheels 77, the first pair of wheels 76 are one pair of the pair of front wheels and the pair of the rear wheels, and the second pair of wheels 77 are the other one pair of the pair of front wheels and the pair of the rear wheels. In some embodiments, as shown in FIGS. 5-12, the engine and the first motor generator 51 may drive the pair of front wheels, and the third motor generator 201 and the fourth motor generator 301 may drive the pair of rear wheels.

In some embodiments, as shown in FIGS. 9-12, the third motor generator 201 is configured to rotate together with one of the second pair of wheels 77. In the present embodiment, the third motor generator 201 may output power to this one wheel so as to drive this one wheel to rotate. In some embodiments, power from this one wheel may be transmitted to the third motor generator 201, thus driving the third motor generator 201 to generate electric power.

In some embodiments, the fourth motor generator 301 is configured to rotate together with the other one of the second pair of wheels 77. In the present embodiment, the fourth motor generator 301 may output power to the other one wheel so as to drive the other wheel to rotate. In some embodiments, power from the other wheel may be transmitted to the fourth motor generator 301, thus driving the fourth motor generator 301 to generate electric power. In some embodiments, as shown in FIGS. 5-12, the third motor generator 201 is configured to rotate together with a left rear wheel of the vehicle, and the fourth motor generator 301 is configured to rotate together with a right rear wheel of the vehicle. This embodiment is provided for example, and the present disclosure should not be construed to be limited by this embodiment.

In some embodiments, the antiskid synchronizer 503 is configured to selectively synchronize the second pair of wheels 77, such that the second pair of wheels 77 may rotate together. In the present embodiment, the antiskid synchronizer 503 may synchronize the second pair of wheels 77, i.e., the antiskid synchronizer 503 is in an engaged state, such that the second pair of wheels 77 may form a fixed engagement. In this way, the second pair of wheels 77 may rotate together, without rotating at different rotating speeds.

In some embodiments, when the antiskid synchronizer 503 is in a disengaged state, and the third motor generator 201 and the fourth motor generator 301 may drive corresponding wheels respectively, such that the corresponding wheels may rotate at different rotating speeds, thus the object that different wheels rotates at different speeds may be achieved. In some embodiments, when the antiskid synchronizer 503 is in a disengaged state, the third motor generator 201 and the fourth motor generator 301 may drive the second pair of wheels 77 to rotate at a same rotating speed.

With the power transmission system 100 according to embodiment of the present disclosure, the third motor generator 201 and the fourth motor generator 301 are provided and configured to drive the second pair of wheels 77 respectively, and therefore the second pair of wheels 77 rotating at different rotating speeds may be achieved. When one of the second pair of wheels 77 is skidding, the antiskid synchronizer 503 may synchronize the second pair of wheels 77 such that the second pair of wheels 77 rotate together. In this way, powers output by two motors (for example, the third motor generator 201 and the fourth motor generator 301) or one motor (for example, the third motor generator 201 or the fourth motor generator 301) may be coupled to drive the second pair of wheels 77 together, thus enhancing the antiskid capability and passing performance of the vehicle.

The power transmission system 100 according to embodiment of the present disclosure include the antiskid synchronizer 503, and therefore a mechanical self-locking differential mechanism commonly used in an axle (such as a rear axle) a conventional power transmission system may be avoided. In addition to the functions of the antiskid synchronizer 503 itself, the function of a mechanical self-locking differential mechanism are performed by the antiskid synchronizer 503, and therefore the power transmission system 100 according to embodiments of the present disclosure may have a more compact structure and relatively lower cost.

The third motor generator 201, the fourth motor generator 301, and transmission method thereof will be described below in detail with references to FIGS. 9-12.

Figure 9:
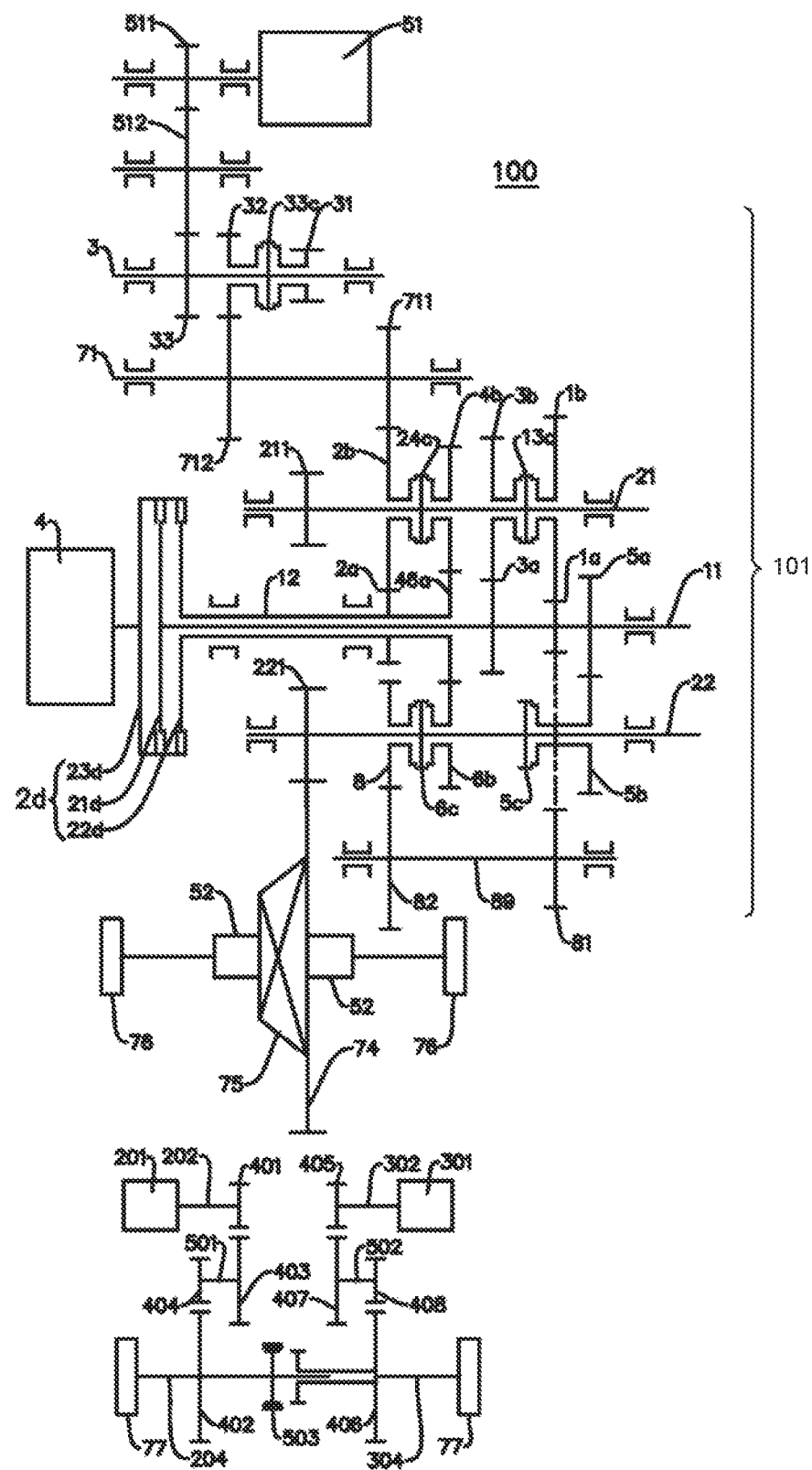
FIG. 9 is a schematic view of an exemplary power transmission system according to an embodiment of the present disclosure.
Figure 10:
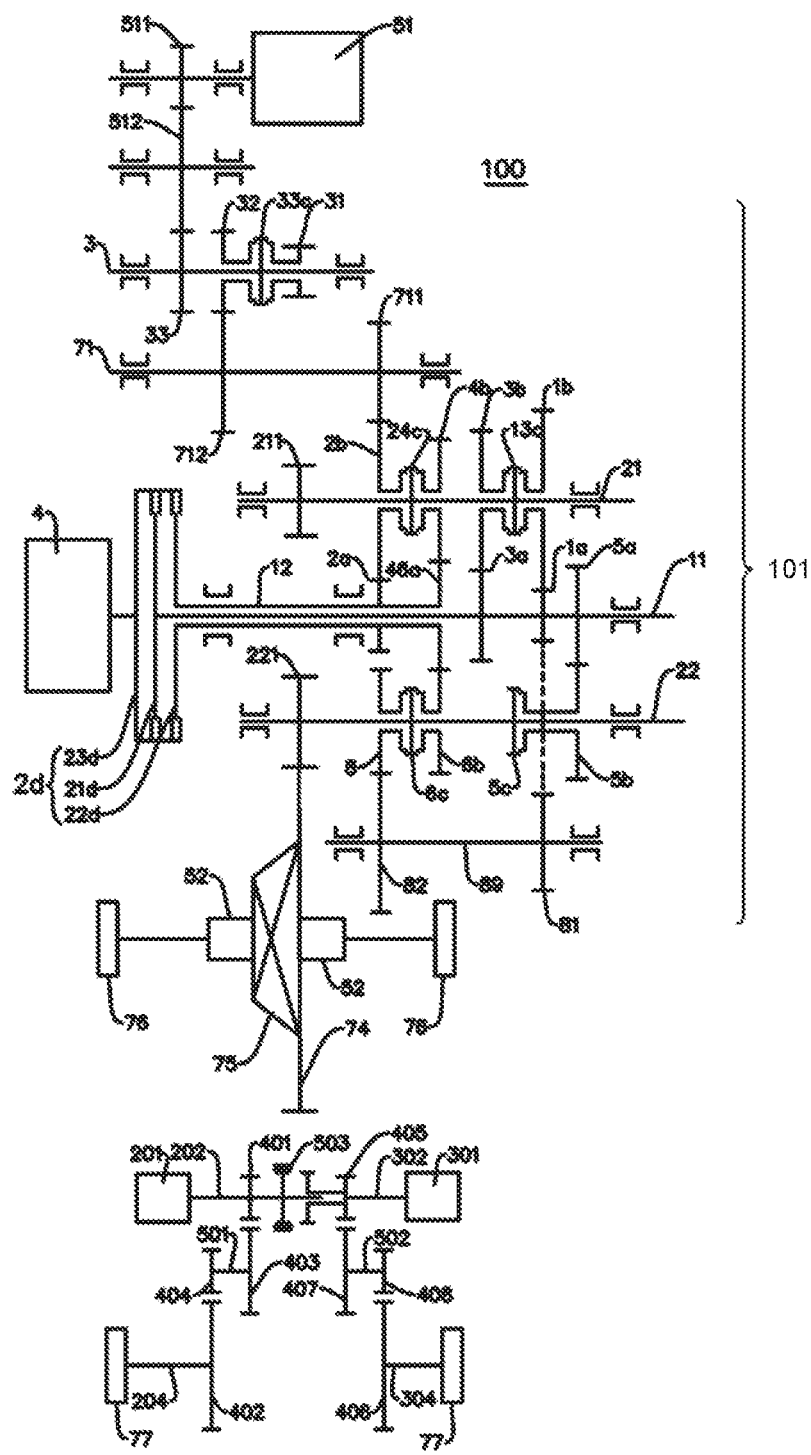
FIG. 10 is a schematic view of an exemplary power transmission system according to an embodiment of the present disclosure.
Figure 11:
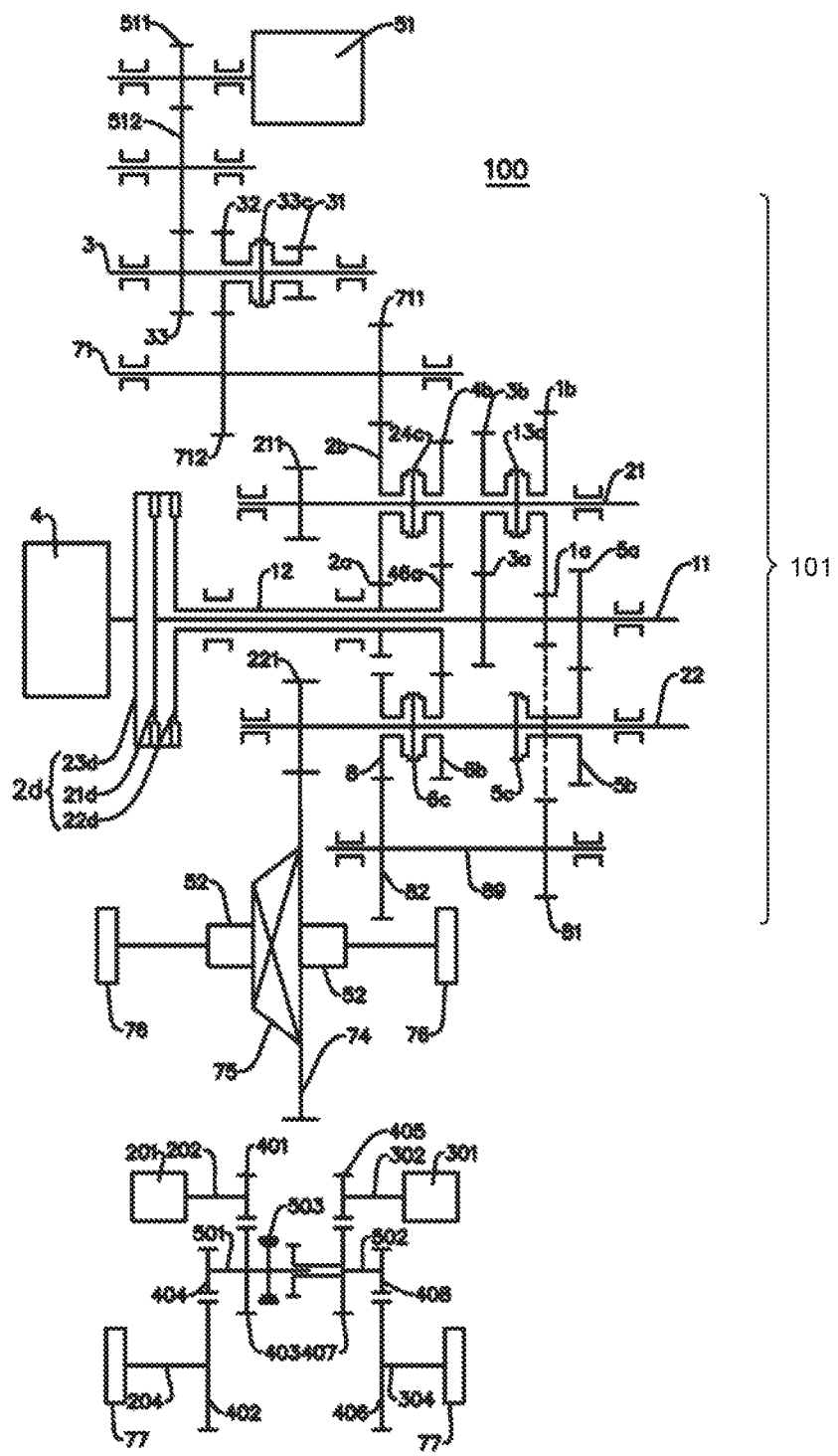
FIG. 11 is a schematic view of an exemplary power transmission system according to an embodiment of the present disclosure.

In some embodiments, as shown in FIGS. 9-11, the third motor generator 201 may perform power transmission with the corresponding wheel via a gear mechanism. In some embodiments, the fourth motor generator 301 may perform power transmission with the corresponding wheel via a gear mechanism.

The gear mechanism has simple structure and is convenient for using in power transmission. In addition, with the gear mechanism, a required transmission ratio may be obtained and the power transmission may be reliable. In some embodiments, the third motor generator 201 and the fourth motor generator 301 may perform power transmission with corresponding wheel(s) via a same gear mechanism. In the present embodiment, the gear mechanism is common, and the power transmission system 100 may be highly symmetric, thus avoiding the center of gravity moving to one side. With one common gear mechanism, the center of gravity may be located right in the middle or substantially the middle of the two wheels, and both the stability and reliability of the power transmission system 100 may be improved.

In some embodiments, as shown in FIGS. 9-11, the gear mechanism between the third motor generator 201 and the corresponding wheel may include a first gear 401, a second gear 402, a third gear 403, and a fourth gear 404.

In some embodiments, the first gear 401 may be disposed on the first output shaft 202 corresponding to the third motor generator 201, and the first gear 401 is configured to rotate together with the first output shaft 202. In some embodiments, the first output shaft 202 may output power generated by the third motor generator 201. In some embodiments, the first output shaft 202 may transmit power generated by the corresponding wheel to the third motor generator 201. In some embodiments, the first output shaft 202 and the third motor generator 201 may share a same motor shaft. In some embodiments, the motor shaft of the first output shaft 202 and the motor shaft the third motor generator 201 may be two individual parts different from each other. In the present embodiment, the motor shaft of the first output shaft 202 and the motor shaft the third motor generator 201 may be connected to each other.

In some embodiments, a first drive shaft 204 is connected with a wheel corresponding to the third motor generator 201, and the second gear 402 is disposed on the first drive shaft 204 and configured to rotate together with the first drive shaft 204. The third gear 403 and the first gear 401 are configured to mesh with each other, and the fourth gear 404 and the second gear 402 are configured to mesh with each other. The third gear 403 and the fourth gear 404 are coaxially arranged and may rotate together.

In some embodiments, as shown in FIGS. 9-11, the gear mechanism between the fourth motor generator 301 and the corresponding wheel may include a fifth gear 405, a sixth gear 406, a seventh gear 407, and an eighth gear 408. The fifth gear 405 may be disposed on the second output shaft 302 corresponding to the fourth motor generator 301, and the fifth gear 405 is configured to rotate together with the second output shaft 302. In some embodiments, the second output shaft 302 may output power generated by the fourth motor generator 301. In some embodiments, the second output shaft 302 may transmit power generated by the corresponding wheel to the fourth motor generator 301. In some embodiments, the second output shaft 302 and the fourth motor generator 301 may share one motor shaft. In some embodiments, the motor shaft of the second output shaft 302 and the motor shaft of the fourth motor generator 301 may be two individual parts different from each other. In the present embodiment, the motor shaft of the second output shaft 302 and the motor shaft of the fourth motor generator 301 may be connected to each other.

In some embodiments, a second drive shaft 304 is connected with a wheel corresponding to the fourth motor generator 301, and the sixth gear 406 is disposed on the second drive shaft 304 and configured to rotate together with the second drive shaft 304. The seventh gear 407 and the fifth gear 405 are configured to mesh with each other, and the eighth gear 408 and the sixth gear 406 are configured to mesh with each other. The seventh gear 407 and the eighth gear 408 are coaxially arranged and may rotate together.

In some embodiments, the first gear 401 and the fifth gear 405 may have the same structure, such as having the same size and the same number of teeth. In some embodiments, the second gear 402 and the sixth gear 406 may have the same structure, such as having the same size and the same number of teeth. In some embodiments, the third gear 403 and the seventh gear 407 may have the same structure, such as having the same size and the same number of teeth. In some embodiments, the fourth gear 404 and the eighth gear 408 may have the same structure, such as having the same size and the same number of teeth. Therefore, versatility of the gear mechanism may be improved.

In some embodiments, the third gear 403 and the fourth gear 404 may be fixed on the first gear shaft 501, and the seventh gear 407 and the eighth gear 408 may be fixed on the second gear shaft 502. In some embodiments, the third gear 403 and the fourth gear 404 may form a substantial ladder shape or a joint gear structure. In some embodiments, the seventh gear 407 and the eighth gear 408 may form a substantial ladder shape or a joint gear structure.

In some embodiments, as shown in FIG. 9, the antiskid synchronizer 503 may be disposed on the first drive shaft 204 and configured to selectively engage with the sixth gear 406. In some embodiments, a gear ring may be provided on a side of the sixth gear 406 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 10, the antiskid synchronizer 503 may be disposed on the first output shaft 202 and configured to selectively engage with the fifth gear 405. In some embodiments, a gear ring may be provided on a side of the fifth gear 405 facing the antiskid synchronizer 503, and the antiskid synchronizer 503 may include an engaging sleeve to adapt to the gear ring. With the engagement of the antiskid synchronizer 503, the second pair of wheels 77 may rotate together.

In some embodiments, as shown in FIG. 11, the antiskid synchronizer 503 may be disposed on the first gear shaft 501 and configured to selectively engage with the seventh gear 407. In some embodiments, a gear ring may be provided on a side of the seventh gear 407 facing the antiskid synchronizer 503, and the antiskid synchronizer 503 may include an engaging sleeve to adapt to the gear ring. With the engagement of the antiskid synchronizer 503, the second pair of wheels 77 may rotate together.

Figure 12:
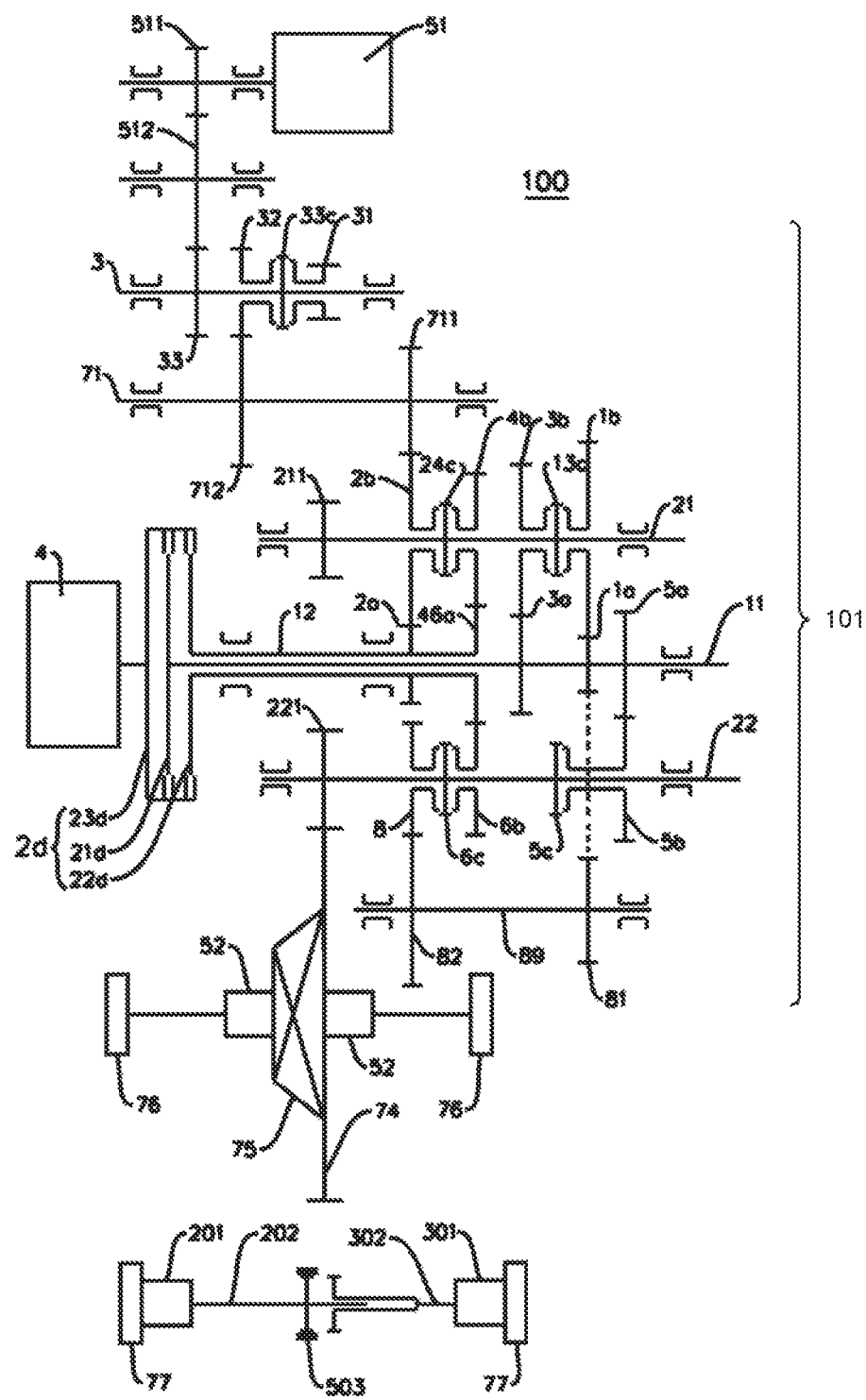
FIG. 12 is a schematic view of an exemplary power transmission system according to an embodiment of the present disclosure.

In some embodiments, as shown in FIG. 12, the third motor generator 201 may be connected coaxially with a corresponding wheel, and the fourth motor generator 301 may be connected coaxially with a corresponding wheel. In some embodiments, both the third motor generator 201 and the fourth motor generator 301 may be wheel-side motors, thus shortening the transmission passage, reducing the power transmission loss and enhancing the transmission efficiency.

In some embodiments, as shown in FIG. 12, the antiskid synchronizer 503 may be disposed on the first output shaft 202 corresponding to the third motor generator 201, and configured to selectively engage with the second output shaft 302 corresponding to the fourth motor generator 301. With the engagement of the antiskid synchronizer 503, the second pair of wheels 77 may rotate together.

The power transmission system 100 and the condition the power transmission system 100 may be used will be described below with reference to FIGS. 1-12.

Embodiment 1

As shown in FIG. 2, the engine 4 is connected with the input terminal 23d of the dual clutch 2d, the first output terminal 21d of the dual clutch 2d is connected with the first input shaft 11, and the second output shaft 22d of the dual clutch 2d is connected with the second input shaft 12. The input terminal 23d may be disengaged from both the first output terminal 21d and the second output terminal 22d, or the input terminal 23d may be engaged with one of the first output terminal 21d and the second output terminal 22d, or the input terminal 23d may be engaged with both the first output terminal 21d and the second output terminal 22d.

The second input shaft 12 may be a hollow shaft, and the first input shaft 11 may be a solid shaft. The second input shaft 12 is coaxially fitted over the first input shaft 11, and a part of the first input shaft 11 extends outside of the second input shaft 12 along an axial direction of the second input shaft 12.

The first-gear shift driving gear 1a, the third-gear shift driving gear 3a and the fifth-gear shift driving gear 5a are disposed on the first input shaft 11 and configured to rotate together with the first input shaft 11. The first-gear shift driving gear 1a is positioned in the middle of the fifth-gear shift driving gear 5a and the third-gear shift driving gear 3a. The fifth-gear shift driving gear 5a is positioned on the right side, and the third-gear shift driving gear 3a is on the left side of the first-gear shift driving gear 1a.

The second-gear shift driving gear 2a and the fourth-sixth shift driving gear 46a are disposed on the second input shaft 12 and configured to rotate together with the second input shaft 12, and the second-gear shift driving gear 2a is positioned on the left side and the fourth-sixth shift driving gear 46a is positioned on the right side.

The first output shaft 21 is arranged parallel to the two input shafts, i.e., the first and second input shafts 11, 12. The first-gear shift driven gear 1b, the second-gear shift driven gear 2b, the third-gear shift driven gear 3b and the fourth-gear shift driven gear 4b are fitted over the first output shaft 21. The first-gear shift driven gear 1b is configured to mesh directly with the first-gear shift driving gear 1a, the second-gear shift driving gear 2a is configured to mesh directly with the second-gear shift driven gear 2 b, the third-gear shift driving gear 3a is configured to mesh directly with the third-gear shift driven gear 3b, and the fourth-sixth shift driving gear 46a is configured to mesh directly with the fourth-gear shift driven gear 4b.

The first-third gear synchronizer 13c, the second-fourth gear synchronizer 24c are disposed on the first output shaft 21, and the first-third gear synchronizer 13c is positioned between the first-gear shift driven gear 1b and the third-gear shift driven gear 3b and configured to selectively synchronize the first-gear shift driven gear 1b with the first output shaft 21 and to selectively synchronize the third-gear shift driven gear 3b and the first output shaft 21. The second-fourth gear synchronizer 24c is positioned between the second-gear shift driven gear 2b and the fourth-gear shift driven gear 4b and configured to selectively synchronize the second-gear shift driven gear 2b and the first output shaft 21 or to selectively synchronize the fourth-gear shift driven gear 4b and the first output shaft 21.

The second output shaft 22 is arranged parallel to the two input shafts, i.e., the first and second input shafts 11, 12. The fifth-gear shift driven gear 5b and the sixth-gear 6b are fitted over the second output shaft 22. The fifth-gear shift driven gear 5b may mesh with the fifth-gear shift driving gear 5a directly. The sixth-gear shift driven gear 6b is fitted over the second output shaft 22 and configured to mesh with the fourth-sixth-gear shift driving gear 46a. The fifth-gear synchronizer 5c is disposed on the second output shaft 22 and is configured to synchronize the fifth-gear shift driven gear 5b with the second output shaft 22. The sixth-gear synchronizer 6c is disposed on the second output shaft 22 and is configured to engage with the sixth-gear shift driven gear 6c or to engage with the reverse output shaft gear 8 fitted over the second output shaft 22. In other words, the six-gear synchronizer 6c is configured as a reverse synchronizer.

The gear 81 and the reverse idler gear 82 are both fixed on the reverse shaft 89. The gear 81 is configured to mesh with the first-gear shift driving gear 1a. The reverse idler gear 82 is configured to mesh with reverse output gear 8.

The first output gear 211 is fixed on the first output shaft 21 and configured to mesh with the shift driven gear 74. The second output gear 221 is fixed on the second output shaft 22 and configured to mesh with the shift driven gear 74.

The motor power shaft 3 is disposed coaxially with the two input shafts such as the first and the second input shafts 11, 12 and the two output shafts such as the first and second output shafts 21, 22. The first motor gear 31 and the second motor gear 32 are fitted over the motor power shaft 3. The motor synchronizer 33c located in-between of first motor gear 31 and the second motor gear 32 is disposed on the motor power shaft 3. The motor synchronizer may be engaged with either one of the first motor gear 31 or the second motor gear 32.

The first motor gear 31 is configured to mesh with the shift driven gear 74. The second motor gear 32 is configured to mesh with the second idler gear 712. The second idler gear 712 and the first idler gear 711 are fixed on the idler shaft 71. The first idler gear 711 is fixed on the second driven gear 2b.

The first generator gear 511 is disposed on the first motor generator 51 and may transmit with the third generator gear 33 fixed on the generator gear via idler gear 512.

A condition in which the power transmission system 100 according to embodiments of the present disclosure may be used will be discussed below in detail with reference to FIG. 1.

Parking-Charging Condition

The input terminal 23d of the dual clutch 2d is engaged with the second output terminal 22d while disengaged from the first output terminal 21d. The motor synchronizer 33c engages the first motor gear 32, such that power generated by the engine 4 may be transmitted to the first motor generator 51 via the input terminal 23d, the second output terminal 22d, the second input shaft 12, the second-gear gear pair, the idler shaft 71, the second motor gear 32 and the motor power shaft 3 sequentially, thus driving the first motor generator 51 to generate electric power.

In the parking-charging condition, charging the vehicle with a fixed velocity ratio may be achieved, and the power transmission efficiency may be increased. Those with ordinary skill in the art will appreciate that the velocity ratio relates to parameters such as the rotating speed of the engine 4 in the parking state, the type of the first motor generator 51, and maximum rotating speed acceptable by the peripheral parts such as bearings, and so on. In the present disclosure, the velocity ratio may be designed according to the above parameters and the power transmission ratio may be flexibly designed, thus making maximum use of the power from the engine 4 and achieving the object of fast charging. In the parking-charging condition, power from the engine 4 may be transmitted via a passage consisting of the second input shaft 12, the second-gear gear pair, the second motor gear 32 and the motor power shaft 3, and therefore the object of charging with an optimal fixed velocity ratio may be achieved, and both the charging efficiency and the fuel economy of the engine are improved.

First Electric Condition

The motor synchronizer 33c engages the first motor gear 31, and power generated by the first motor 51 is transmitted to the first motor gear 31 via motor power shaft 3. This transmission passage has less transmission components and higher efficacy.

Second Electric Condition

The motor synchronizer 33c engages the second motor gear 32, and the power generated by the first motor generator 51 is transmitted to either the second-gear shift driven gear 2b or the fourth-gear shift driven gear 4b via the second motor gear 32 and the idler shaft 71.

In the electric condition, such as the first electric condition or the second electric condition, power from the first motor generator 51 may be transmitted to wheels of the vehicle via two power transmission passages having different velocity ratios, thus driving the vehicle to run. In cases when the first motor generator 51 is used to start, to accelerate, to climb or to run, different velocity ratios may be selected accordingly to ensure that the first motor generator 51 has the highest operation efficiency.

First First-Gear Hybrid Condition

The motor synchronizer 33c engages the first motor gear 31, and the power generated by the first motor generator 51 is transmitted to the first motor gear 31 via the motor power shaft 3.

The first power generated by the engine 4 can be transmitted to any of the forward gear pairs. The first power and the second power generated by the first motor generator 51 are coupled at the driven gear 74, and then output together.

In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

First Second-Gear Hybrid Condition

In the first second-gear hybrid condition, the motor synchronizer 33c may engage with the second motor gear 32. The power generated by the first motor generator 51 may be transmitted to the second input shaft 12 via the second motor gear 32 and the idler shaft 71, such that the power generated by the first motor generator 51 may output via the second-gear gear pair or the fourth-gear gear pair. At the same time, the first power generated by the engine 4 can be transmitted by any of the forward gear pairs. The first power and the second power generated by the first motor generator 51 are coupled at the driven gear 74, and then transmitted to the wheels of the vehicle.

In some embodiments, the power generated by the engine 4 may be transmitted by the second-gear gear pair or the fourth-gear gear pair, the first motor generator 51 may adjust the speed, such that the second input shaft 12 may synchronously receive the first power from the engine 4 and the second power from the first motor generator 51, to provide a smooth and harmonious power transmission.

In some embodiments, the power generated by the engine 4 may be transmitted by the first-gear gear pair or the third-gear gear pair, the first motor generator 51 may adjust the speed, such that the first output shaft 21 may synchronously receive the first power from the engine 4 and the second power from the first motor generator 51, to provide a smooth and harmonious power transmission.

In some embodiments, the power generated by the engine 4 may be transmitted by the fifth-gear gear pair, the first motor generator 51 may adjust the speed, such that the shift driven gear 74 may synchronously receive the first power from the engine 4 and the second power from the first motor generator 51, to provide a smooth and harmonious power transmission.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

First First-Gear Driving-Charging Condition In the first first-gear driving-charging condition, the motor synchronizer 33c may engage with the first motor gear 31. In some embodiments, the vehicle may be driven by the power generated by the engine 4 via any of the forward gear pairs. In some embodiments, the first motor generator 51 may drive to generate electric power by the power generated by corresponding wheel.

First Second-Gear Driving-Charging Condition

In the first second-gear driving-charging condition, the motor synchronizer 33c may engage with the second motor gear 32. The power generated by the engine 4 may be transmitted via the even number-gear gear pair, for example, via the second-gear gear pair, the fourth-gear gear pair or the sixth-gear gear pair. The other part of the power generated by the engine 4 may transmit to the first motor generator 51 via the second-gear gear pair, idler shaft 71 and the second motor gear 32, such that to drive the first motor generator 51 to generate the electric power.

First Third-Gear Driving-Charging Condition

Both in the first-gear driving-charging and the second-gear driving-charging conditions, one of the two gear parts of the dual clutch 2d is engaged when performing power transmission, for example, the input terminal 23d is engaged with the first output terminal 21d or engaged with the second output terminal 22d. In the third first-gear driving-charging condition, the input terminal 23d is engaged with both the first output terminal 21d and the second output terminal 22d, thus achieving a new driving-charging condition.

In the first third-gear driving-charging condition, the motor synchronizer 33c may engage with the second motor gear 32. A part of the power generated by the engine 4 can be transmitted to the first motor generator 51 via the second input shaft 12, the second-gear gear pair, the idler shaft 71 and the second motor gear 32, thus to drive the first motor generator 51 to generate electric power. The other part of the power generated by the engine 4 may transmit to the first input shaft 11, and then this part of the power may output via the first-gear gear pair, the third-gear gear pair or the fifth-gear gear pair.

In the present disclosure, a person skilled in the art may flexibly select any of the above hybrid conditions and power transmission passages thereof according to practical requirements. With these hybrid conditions, more driving fun may be provided to the users. In addition, the vehicle may be used in different road conditions, thus enhancing both the power and the fuel economy of the vehicle.

In the driving-charging conditions, a part of power from the engine 4 may be transmitted via a passage consisting of the second input shaft 12, the second-gear gear pair, the idler shaft 71, the second motor gear 32 and the motor power shaft 3, and therefore the object of charging with an optimal fixed velocity ratio may be achieved, and both the charging efficiency and the fuel economy of the engine 4 are improved.

Mechanical Reverse Condition

In the mechanical reverse condition, the sixth gear synchronizer 6c, i.e. the reverse synchronizer 6c is engaged with the reverse output gear 8. First power generated by the engine 4 may be transmitted the second output shaft 22 via the first input shaft 11, the reverse gear 89 and the reverse output gear 8.

Electric Reverse Condition

In the electric reverse mode, the motor synchronizer 33c is engaged with the first motor gear 31. Power generated by the first motor generator 51 may be transmitted to the wheels of the vehicle via the motor power shaft 3 and the first motor gear 31.

Hybrid (Electric-Mechanic) Reverse Condition

In the hybrid reverse mode, the sixth gear synchronizer 6c is engaged with the reverse output gear 8, and the motor synchronizer 33 is engaged with the first motor gear 31. The first power generated by the engine 4 may output via the second output shaft 22. The second power generated by the first motor generator 51 may be transmitted via the first motor gear 31. The first power and the second power are coupled at the driven gear 74, and then output together. In the hybrid reverse mode, the first motor generator 51 may adjust the speed, such that the shift driven gear 74 may synchronously receive the first power from the engine 4 and the second power from the first motor generator 51, to provide a smooth and harmonious power transmission.

Embodiment 2

As shown in FIG. 2, the power transmission system 100 in the present embodiment is substantially the same as that in Embodiment 2, with the following exceptions. The fifth-gear gear pair 5b is fitted over the first output shaft 21 and the third-gear gear pair is fitted over the second output shaft 22.

Embodiment 3

As shown in FIG. 3, the power transmission system 100 in the present embodiment is substantially the same as that in Embodiment 1, with the following exception. The fifth-gear driving gear 5a is disposed between the first-gear driving gear 1a and the third-gear driving gear 3a.

Embodiment 4

Figure 4:
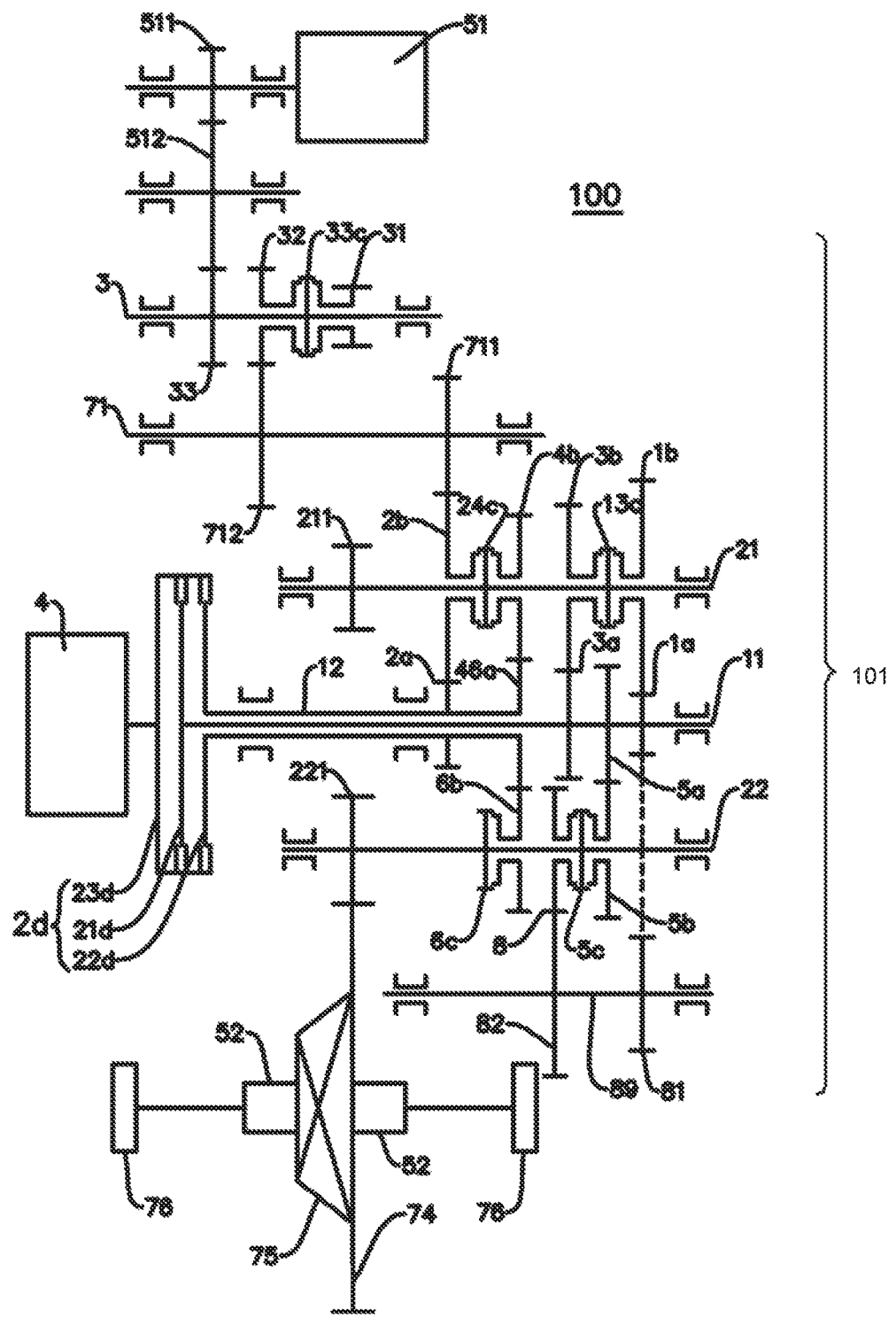
FIG. 4 is a schematic view of an exemplary power transmission system according to an embodiment of the present disclosure.

As shown in FIG. 4, the power transmission system 100 in the present embodiment is substantially the same as that in Embodiment 3, with the following exception. The reverse output gear 8 and fifth-gear driven gear 5b may share a fifth-gear synchronizer 5c.

Embodiment 5

As shown in FIG. 5, the power transmission system 100 in the present embodiment is substantially the same as that in Embodiment 4, with the following exceptions. The idler gear 512 and the corresponding transmission shaft may be avoided, and the further simplification of the idler shaft 71 to the Embodiment 4.

Embodiment 6

As shown in FIG. 6, the power transmission system 100 in the present embodiment is substantially the same as that in Embodiment 5, with the following exceptions. The idler shaft 71 may be avoided and the second motor gear 32 may configure to mesh with the second-gear shift driven gear 2b directly.

Embodiment 7

As shown in FIG. 7, the power transmission system 100 in the present embodiment is substantially the same as that in Embodiment 6, with the following exceptions. The first motor generator 51 may be connected coaxially with the motor power shaft 3, and the corresponding gear transmission mechanism may be avoided as shown in FIG. 6.

Embodiment 8

As shown in FIG. 6, the power transmission system 100 in the present embodiment is substantially the same as that in Embodiment 7, with the following exceptions. The reverse output gear 8 includes two output gears. Each of the reverse output gears 8 may configure to mesh with the corresponding reverse idler gear 82. One reverse output gear 8 may share a fifth gear synchronizer 5*c* with the fifth-gear shift driven gear 5*b*. The other reverse output gear 8 may share a sixth gear synchronizer 6*c* with the sixth-gear shift driven gear 6*b*. Both the fifth gear synchronizer 5*c* and the sixth gear synchronizer 6*c* are reverse synchronizers.

Embodiments 9-12

As shown in FIGS. 9-12, the power transmission system 100 in the present embodiment is substantially the same as that in Embodiment 1, with the exceptions that a rear-wheel driving mechanism, a third motor generator 201, a fourth motor generator 301 and an antiskid synchronizer 503 are added, respectively.

Embodiment 13

Figure 13:
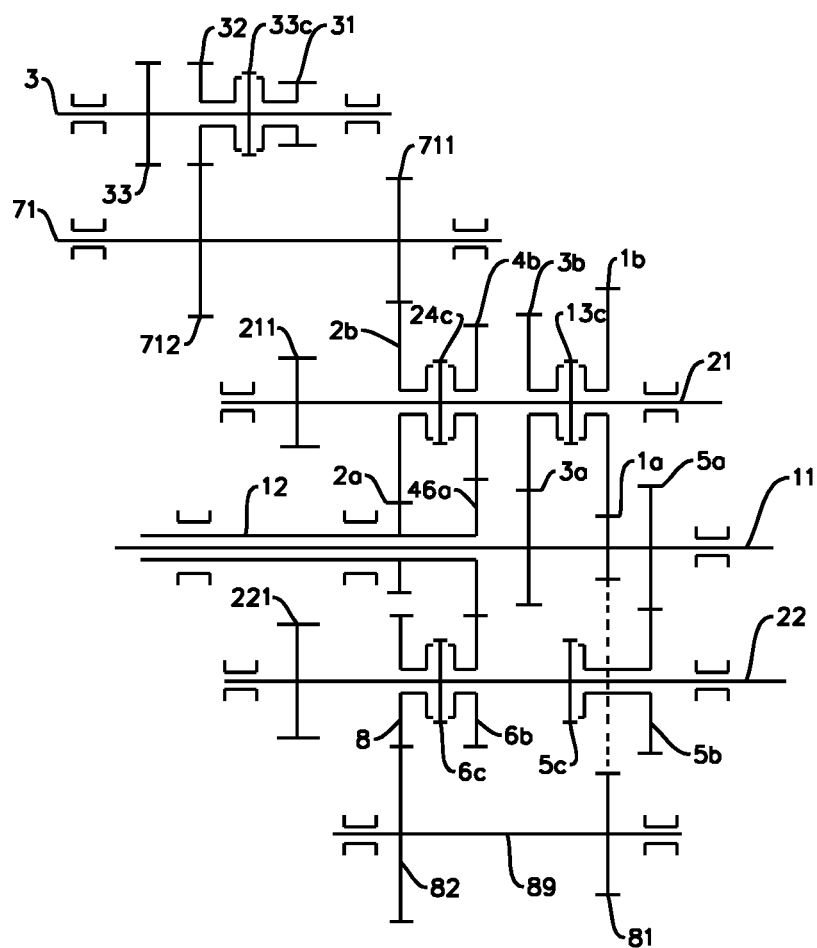
FIG. 13 is a schematic view of an exemplary power transmission unit of a power transmission system according to an embodiment of the present disclosure.

As shown in FIG. 13, the power transmission system 100 in the present embodiment is substantially the same as that in Embodiment 1, with the exceptions that the engine 4, the dual clutch 2*d*, the first motor generator 51 and the differential may be avoided.

Embodiments of the present disclosure further provide a vehicle including the above-identified power transmission system 100. Other configuration such as the driving system, the turning system and the braking system may be well known to those skilled in the art, thus details thereof are omitted herein.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A transmission unit for a vehicle, comprising:
a plurality of input shafts, each of the input shafts having a shift driving gear thereon;
a plurality of output shafts, each of the output shafts having a shift driven gear configured to mesh with a corresponding shift driving gear;
a reverse output gear fitted over one of the output shafts;
a reverse synchronizer configured to engage with the reverse output gear;
a reverse shaft configured to rotate together with one of the input shafts and to rotate together with the reserve output gear;
a motor power shaft;
a first motor gear fitted over the motor power shaft;
a second motor gear fitted over the motor power shaft and configured to rotate together with one of the shift driven gears; and
a motor synchronizer disposed on the motor power shaft and between the first and second motor gears.

2. The transmission unit according to claim 1, further comprising:
an idler shaft;
a first idler gear fixed on the idler shaft and configured to mesh with one of the shift driven gears; and
a second idler gear fixed on the idler shaft and configured to mesh with the second motor gear.

3. The transmission unit according to claim 1, further comprising:
an idler shaft; and
a third idler gear fixed on the idler shaft, wherein power of the second motor gear is transmitted to one of the shift driven gears by the third idler gear.

4. The transmission unit according to claim 1, wherein the second motor gear is configured to mesh with one of the shift driven gears directly.

5. The transmission unit according to claim 1, wherein the reverse output gear includes one or two reverse output gears; wherein one or two reverse idler gears are disposed on the reverse shaft; and wherein the reverse idler gears are configured to mesh with the corresponding reverse output gears.

6. The transmission unit according to claim 5, wherein each of the reverse output gears is configured to share a shift synchronizer with an adjacent shift driven gear; wherein the shift synchronizer is configured as the reverse synchronizer.

7. The transmission unit according to claim 6, wherein the plurality of input shafts comprise a first input shaft and a second input shaft coaxially fitted over the first input shaft; wherein the plurality of output shafts comprise a first and a second output shaft.

8. The transmission unit according to claim 4, wherein the plurality of shift driving gears comprise: a first-gear driving gear fixed on the first input shaft, a second-gear driving gear fixed on the second input shaft, a third-gear driving gear fixed on the first input shaft, a fifth-gear driving gear fixed on the first input shaft, and a fourth-sixth-gear driving gear fixed on the second input shaft;
wherein the plurality of shift driven gears comprise: first-gear to fourth-gear driven gears fitted over the first output shaft, a fifth-gear driven gear and a sixth-gear driven gear fitted over the second output shaft; and
wherein the power transmission system further comprises a first-third gear synchronizer disposed between the first-gear driven gear and the third-gear driven gear, a second-fourth gear synchronizer disposed between the second-gear driven gear and the fourth-gear driven gear, a fifth gear synchronizer disposed on a side of the fifth-gear driven gear, and a sixth gear synchronizer disposed on a side of the sixth-gear driven gear.

9. The transmission unit according to claim 7, wherein the plurality of shift driving gears comprise: a first-gear driving gear fixed on the first input shaft, a second-gear driving gear fixed on the second input shaft, a third-gear driving gear fixed on the first input shaft, a fifth-gear driving gear fixed on the first input shaft, and a fourth-sixth-gear driving gear fixed on the second input shaft;

wherein the plurality of shift driven gears comprise: a first-gear driven gear fitted over the first output shaft, a second-gear driven gear fitted over the first output shaft, a third-gear driven gear fitted over the second output shaft, a fourth-gear driven gear fitted over the first output shaft, a fifth-gear driven gear fitted over the first output shaft, and a sixth-gear driven gear fitted over the second output shaft; and wherein the power transmission system further comprises a first-fifth gear synchronizer disposed between the first-gear driven gear and the fifth-gear driven gear, a second-fourth gear synchronizer disposed between the second-gear driven gear and the fourth-gear driven gear, a third gear synchronizer disposed on a side of the third-gear driven gear, and a sixth gear synchronizer disposed on a side of the sixth-gear driven gear.

10. The transmission unit according to claim 9, wherein the distance between the fifth-gear shift driving gear and the engine, the distance between the first-gear shift driving gear and the engine, and the distance between the third-gear shift driving gear and the engine are in order from large to small;

wherein the distance between the third-gear shift driving gear and the engine, the distance between the first-gear shift driving gear and the engine, and the distance between the fifth-gear shift driving gear and the engine are in order from large to small; and wherein the distance between the first-gear shift driving gear and the engine, the distance between the fifth-gear shift driving gear and the engine, and the distance between the third-gear shift driving gear and the engine are in order from large to small.

11. The transmission unit according to claim 7, further comprising a first output gear fixed on the first output shaft and a second output gear fixed on the second output shaft, wherein the first output gear, the second output gear and the first motor gear are configured to mesh with the driven gear of a main reducer.

12. A power transmission system for a vehicle, comprising:
a transmission unit according to claim 1; and
a first motor generator configured to rotate together with the motor power shaft of the transmission unit.

13. The power transmission system according to claim 12, wherein:
the reverse output gear includes one or two reverse output gears;
one or two reverse idler gears are disposed on the reverse shaft;
the reverse idler gears are configured to mesh with the corresponding reverse output gears, and each of the reverse output gears is configured to share a shift synchronizer with an adjacent shift driven gear;
the shift synchronizer is configured as the reverse synchronizer;
the plurality of input shafts comprise a first input shaft and a second input shaft coaxially fitted over the first input shaft;
the plurality of output shafts comprise a first and a second output shaft; and wherein the power transmission system further comprises:
an engine; and
a dual clutch, wherein the dual clutch comprises: an input terminal connected with the engine, a first output terminal connected with the first input shaft, and a second output terminal connected with the second input shaft.

14. The transmission unit according to claim 12, further comprising a third motor gear fixed on the motor power shaft;
wherein the first motor generator is configured to mesh with the third motor gear directly.

15. The transmission unit according to claim 14, further comprising a first generator gear disposed on the motor shaft of the first motor generator, and to perform a transmission with the third motor gear via an idler gear.

16. The transmission unit according to claim 12, wherein the first motor generator is coaxially connected with the motor power shaft.

17. The power transmission system according to claim 13, wherein the engine is configured to transmit power to a shift driven gear rotated together with the second motor gear, and to transmit the power to the first motor generator by synchronizing the second motor gear via a motor synchronizer to drive the first motor generator to generate electric power, when the vehicle is in a parking state.

18. The power transmission system according to claim 13, wherein the vehicle is operable in a mechanical reverse mode, an electric reverse mode and a hybrid reverse mode,
wherein the engine is configured to generate a first power and the first motor generator is configured to generate a second power;
when the vehicle is operated in the mechanical reverse mode, the engine is configured to transmit the first power to the reverse shaft of the transmission unit, and to transmit the first power to the reverse output gear via a synchronization of the reverse synchronizer to one of the reverse output gears;
wherein, when the vehicle is operated in the electric reverse mode, the first motor generator is configured to transmit the second power to the first motor gear via a synchronization of the motor synchronizer to the first motor gear; and
wherein, when the vehicle is operated in the hybrid reverse mode, the engine is configured to transmit the first power to the reverse shaft of the transmission unit, and to transmit the first power to the reverse output gear via the synchronization of the reverse synchronizer to one of the reverse output gears; and the first motor generator is configured to transmit the second power to the first motor gear via the synchronization of the motor synchronizer to the first motor gear.

19. The power transmission system according to claim 13, wherein the engine is configured to transmit a first part of power to wheels of the vehicle via one of the output shafts by engaging the input terminal of the dual clutch with the first output terminal and the second output terminal of the dual clutch simultaneously to drive the vehicle, and to transmit a second part of power to the first motor generator via the second motor gear to drive the first motor generator to generate electric power.

20. The power transmission system according to claim 13, further comprising a second motor generator, wherein the second motor generator is configured to perform power transmission with a driven gear of a main reducer of the vehicle; or
wherein the second motor generator is connected with the first output shaft; or wherein the second motor generator is connected with the first input shaft; or wherein the driven gear of the main reducer is disposed on a differential of the vehicle, and two second motor generators are provided and disposed on two sides of the differential respectively.

21. The power transmission system according to claim 13, wherein the engine and/or the first motor generator is configured to drive a first pair of wheels of the vehicle, and the power transmission system further comprises:

a third motor generator configured to rotate together with one of a second pair of wheels of the vehicle;

a fourth motor generator configured to rotate together with the other of the second pair of wheels of the vehicle, an antiskid synchronizer configured to selectively synchronize the second pair of wheels, wherein the first pair of wheels are one pair of front wheels and rear wheels of the vehicle, and the second pair of wheels are the other pair of the front wheels and the rear wheels.

22. The power transmission system according to claim 21, further comprising a first gear disposed on a first power output shaft corresponding to the third motor generator;

a second gear disposed on a first drive shaft connected with the one of the second pair of wheels corresponding to the third motor generator;

a third gear configured to mesh with the first gear;

a fourth gear coaxially arranged with the third gear and configured to mesh with the second gear and rotate synchronously with the third gear;

a fifth gear disposed on a second power output shaft corresponding to the fourth motor generator;

a sixth gear disposed on a second drive shaft connected with a wheel corresponding to the fourth motor generator;

a seventh gear configured to mesh with the fifth gear;

an eighth gear coaxially arranged with the seventh gear and configured to mesh with the sixth gear and rotate synchronously with the seventh gear, wherein the antiskid synchronizer is disposed on the first drive shaft and configured to selectively engage with the sixth gear; or wherein the antiskid synchronizer is disposed on the first power output shaft corresponding to the third motor generator and is configured to selectively engage with the fifth gear; or wherein the third gear and the fourth gear are fixed on a first gear shaft, the seventh gear and the eighth gear are fixed on a second gear shaft, and the antiskid synchronizer is disposed on the first gear shaft and configured to selectively engage with the seventh gear.

23. The power transmission system according to claim 21, wherein the first power output shaft is coaxially connected with a wheel corresponding to the first output shaft, the second power output shaft is coaxially connected with a wheel corresponding to the second output shaft, the antiskid synchronizer is disposed on the first power output shaft and configured to engage with the second power output shaft.

24. A vehicle comprising a power transmission system for a vehicle according to claim 15.

* * * * *